United States Patent
Takenaka et al.

(10) Patent No.: US 10,710,291 B2
(45) Date of Patent: Jul. 14, 2020

(54) FRONT PLATE FOR ONBOARD LCD DEVICE

(71) Applicants: MITSUBISHI GAS CHEMICAL COMPANY, INC., Tokyo (JP); MGC FILSHEET CO., LTD., Saitama (JP)

(72) Inventors: Hirokazu Takenaka, Osaka (JP); Yasuo Oose, Tokyo (JP); Takuya Goto, Tokyo (JP)

(73) Assignees: MITSUBISHI GAS CHEMICAL COMPANY, INC., Tokyo (JP); MGC FILSHEET CO., LTD., Saitama (JP)

(*) Notice: Subject to any disclaimer, the term of this patent is extended or adjusted under 35 U.S.C. 154(b) by 155 days.

(21) Appl. No.: 16/080,783

(22) PCT Filed: Mar. 2, 2017

(86) PCT No.: PCT/JP2017/008213
§ 371 (c)(1),
(2) Date: Aug. 29, 2018

(87) PCT Pub. No.: WO2017/150646
PCT Pub. Date: Sep. 8, 2017

(65) Prior Publication Data
US 2019/0054674 A1    Feb. 21, 2019

(30) Foreign Application Priority Data
Mar. 4, 2016   (JP) .................. 2016-042258

(51) Int. Cl.
*B29C 48/18* (2019.01)
*B32B 27/30* (2006.01)
(Continued)

(52) U.S. Cl.
CPC .............. *B29C 48/18* (2019.02); *B32B 27/08* (2013.01); *B32B 27/30* (2013.01); *B32B 27/302* (2013.01);
(Continued)

(58) Field of Classification Search
CPC ........... B29C 48/18; G02B 1/14; B32B 27/08
See application file for complete search history.

(56) References Cited

U.S. PATENT DOCUMENTS

2013/0272020 A1* 10/2013 Koide ............... G02F 1/133308
                                                          362/603

FOREIGN PATENT DOCUMENTS

JP        2006-103169 A        4/2006
JP        2010-167659 A        8/2010
(Continued)

OTHER PUBLICATIONS

International Search Report in International Patent Application No. PCT/JP2017/008213, dated May 23, 2017.
(Continued)

*Primary Examiner* — Jacob T Minskey
*Assistant Examiner* — Melody Tsui
(74) *Attorney, Agent, or Firm* — Greenblum & Bernstein, P.L.C.

(57) ABSTRACT

A front panel for on-board liquid crystal displays has a high hardness resin composition (B) on at least one side of a layer containing a resin (A) having a polycarbonate resin (a1). The front panel satisfies the following conditions (i) to (iv): (i) the thickness of the layer containing a high hardness resin composition (B) is 10 to 250 μm, and the total thickness of the layer containing a resin (A) comprising a polycarbonate resin (a1) and the layer containing a high hardness resin composition (B) is 100 to 3,000 μm; (ii) the high hardness resin composition (B) consists of any one of specific resin
(Continued)

compositions (B1) to (B3); (iii) the retardation of the front panel is 3,000 nm or more; and (iv) the standard deviation of the second derivative of the irregular shape of the hard coat layer having irregularities is 0.1 or more.

5 Claims, 2 Drawing Sheets

(51) Int. Cl.
*B32B 27/36* (2006.01)
*C08L 25/08* (2006.01)
*C08L 69/00* (2006.01)
*G02B 1/14* (2015.01)
*B32B 27/08* (2006.01)
*G02F 1/1335* (2006.01)
*C08L 33/06* (2006.01)
*G02F 1/1333* (2006.01)

(52) U.S. Cl.
CPC ............ *B32B 27/308* (2013.01); *B32B 27/36* (2013.01); *B32B 27/365* (2013.01); *C08L 25/08* (2013.01); *C08L 69/00* (2013.01); *G02B 1/14* (2015.01); *G02F 1/1335* (2013.01); *B32B 2255/10* (2013.01); *B32B 2255/26* (2013.01); *B32B 2307/732* (2013.01); *B32B 2457/202* (2013.01); *C08L 33/06* (2013.01); *G02F 2001/133331* (2013.01); *G02F 2201/38* (2013.01); *G02F 2201/54* (2013.01)

(56) References Cited

FOREIGN PATENT DOCUMENTS

JP    2011-123380 A    6/2011
WO    2012/049977 A1   4/2012

OTHER PUBLICATIONS

International Preliminary Report on Patentability in International Patent Application No. PCT/JP2017/008213, dated Sep. 4, 2018.

* cited by examiner

[Figure 1]
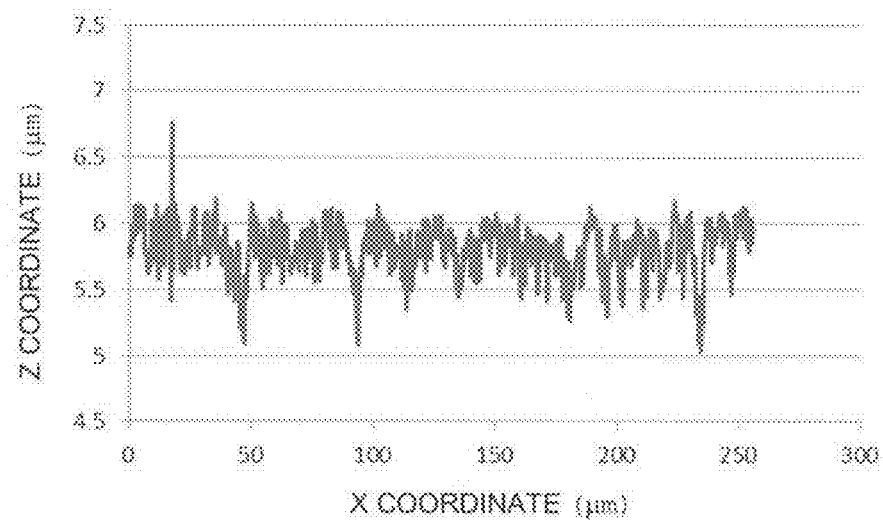
[Figure 2]
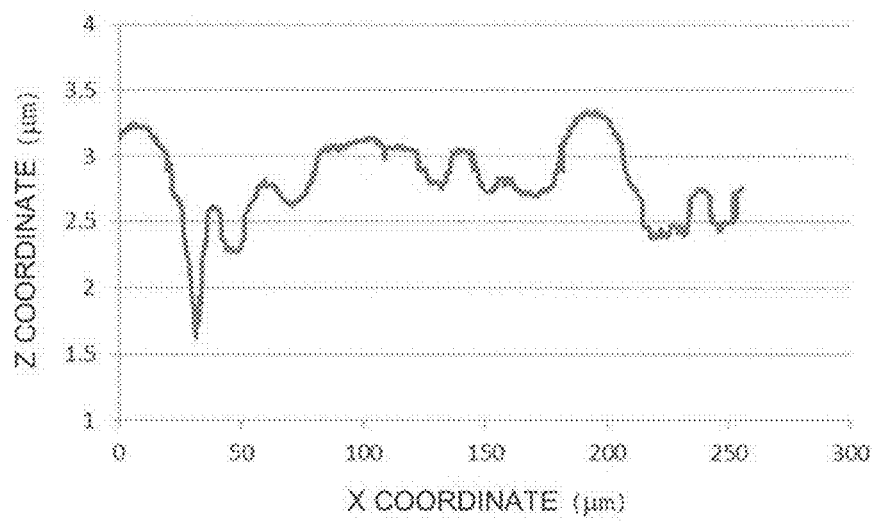

[Figure 3]
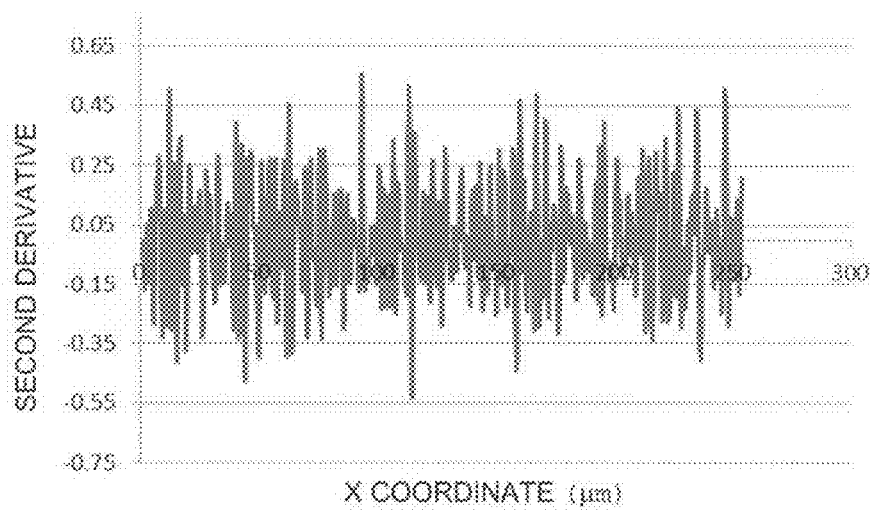
[Figure 4]
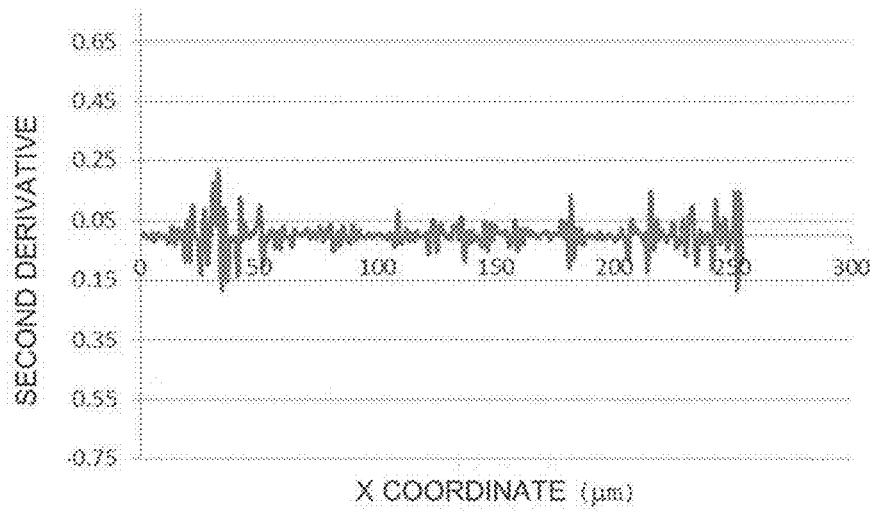

FRONT PLATE FOR ONBOARD LCD DEVICE

TECHNICAL FIELD

The present invention relates to a front panel for on-board liquid crystal displays. Particularly, the present invention relates to a front panel that prevents glare, has high abrasion resistance, also has high pencil hardness, and is also excellent in the inhibition of warpage, while having excellent impact resistance, heat resistance and anti-glare performance, and is suitable for use in on-board liquid crystal displays.

BACKGROUND ART

Front panels are disposed in liquid crystal displays for the purpose of protecting liquid crystal panels, etc. Examples of materials for use in conventional front panels for liquid crystal displays include (meth)acrylic resins typified by polymethyl methacrylate (PMMA).

In recent years, front panels having sheets made of polycarbonate resins have also been used because of having high impact resistance, heat resistance, secondary workability, lightness and transparency, etc. Particularly, a front panel for liquid crystal displays that has a hard coat on a multilayer sheet having an acrylic resin laminated on the surface layer of a polycarbonate resin sheet has been adopted to a wide range of front panels for liquid crystal displays, because of having excellent impact resistance, heat resistance, workability and transparency of the polycarbonate resins while having surface hardness and abrasion resistance comparable to conventional acrylic resins with a hard coat (see, for example, Patent Document 1).

The front panel for liquid crystal displays having the polycarbonate resin sheet is generally formed by a melt extrusion method, together with the acrylic resin.

In liquid crystal displays, an optical laminate for antireflection is generally disposed on an outermost surface. Such an optical laminate for antireflection suppresses image reflection or reduces reflectance by light scattering or interference.

An anti-glare film provided with an anti-glare layer having an irregular shape on the surface of a transparent base material is known as one of the optical laminates for antireflection. This anti-glare film can scatter outside light by the irregular shape of the surface and thereby prevent visibility from being reduced due to outside light reflection or image reflection. Also, this optical laminate is required to be provided with hard coat properties so as not to be damaged upon handling, because the optical laminate is usually placed on the outermost surface of a liquid crystal display.

The anti-glare film is required to have anti-glare properties and additionally desired to exert favorable contrast when located on the surface of a liquid crystal display, and to prevent so-called "glare", which reduces visibility due to a brightness distribution resulting from the interference of the surface irregular shape of the anti-glare film with liquid crystal display pixels, when located on the surface of a liquid crystal display.

In the case of using such a liquid crystal display for on-board purposes such as car navigation systems, the inside temperature of a car changes greatly from low to high temperatures in an environment so that the front panel is prone to be deformed due to shrinkage and expansion ascribable to thermal fluctuation, leading to problems such as the generation of squeak noise by deformation. Particularly, in recent years, high retardation drawn front panels have been used as measures against blackout by polarized sunglasses and are therefore more prone to be deformed.

A resin laminate of Patent Document 2 solves the problem of a resin laminate having an acrylic resin layer laminated on a polycarbonate resin layer, i.e., the occurrence of protruding warpage in the acrylic resin layer due to a large dimensional change after moisture absorption between the laminated resin layers. However, the resin laminate of Patent Document 2 still has insufficient resistance to warpage deformation in a temperature environment exceeding 40° C. The temperatures of on-board displays may rise significantly beyond room temperature. Resin plates for use as protective plates for on-board displays are desired to be excellent in resistance to warpage deformation after being exposed to a severe high temperature and high humidity environment such as a high temperature environment exceeding 40° C., for example, an environment having a temperature of 85° C. and a humidity of 85%.

As mentioned above, front panels for on-board liquid crystal displays are required to be provided with various functions such as measures against blackout, anti-glare properties of preventing glare, and prevention of scratches and further required to resist a severe environment such as the inside of cars. Nonetheless, any front panel has not satisfied all of these requirements.

PRIOR ART DOCUMENTS

Patent Documents

Patent Document 1: Japanese Patent Laid-Open No. 2006-103169
Patent Document 2: Japanese Patent Laid-Open No. 2010-167659

SUMMARY OF THE INVENTION

Problems to be Solved by the Invention

An object of the present invention is to solve at least one of the problems associated with the conventional techniques. Another object of the present invention is to provide a front panel that prevents glare, has high abrasion resistance, also has high pencil hardness, and is also excellent in the inhibition of warpage, while exhibiting excellent impact resistance, heat resistance and anti-glare performance, and is suitable for on-board liquid crystal displays.

Means for Solving the Problems

The present inventors have conducted diligent studies to attain the objects and consequently found that a specific configuration is effective for a front panel for on-board liquid crystal displays, reaching the completion of the present invention. Specifically, the present invention is as follows.
<1> A front panel for on-board liquid crystal displays, having a layer containing a high hardness resin composition (B) on at least one side of a layer containing a resin (A) comprising a polycarbonate resin (a1), and further having a hard coat layer having irregularities on the layer containing a high hardness resin composition (B), wherein the front panel satisfies the following conditions (i) to (iv):
(i) the thickness of the layer containing a high hardness resin composition (B) is 10 to 250 µm, and the total thickness of the layer containing a resin (A) comprising a polycarbonate resin (a1) and the layer containing a high hardness resin composition (B) is 100 to 3,000 μm;
(ii) the high hardness resin composition (B) consists of any one of the following resin compositions (B1) to (B3):

Resin Composition (B1)

A copolymer resin comprising a (meth)acrylic acid ester constituent unit (a) represented by the following general formula (1), and an aliphatic vinyl constituent unit (b) represented by the following general formula (2), wherein the total ratio of the methacrylic acid ester constituent unit (a) and the aliphatic vinyl constituent unit (b) is 90 to 100 mol % of all constituent units of the copolymer resin, and the ratio of the (meth)acrylic acid ester constituent unit (a) is 65 to 80 mol % of all constituent units of the copolymer resin:

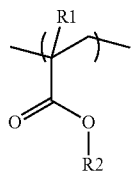

(1)

wherein R1 is a hydrogen atom or a methyl group, and R2 is an alkyl group having 1 to 18 carbon atoms

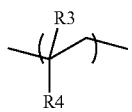

(2)

wherein R3 is a hydrogen atom or a methyl group, and R4 is a cyclohexyl group optionally having a hydrocarbon group having 1 to 4 carbon atoms;

Resin Composition (B2)

A resin composition comprising 55 to 10% by mass of a resin (C) containing a vinyl monomer, and 45 to 90% by mass of a styrene-unsaturated dicarboxylic acid copolymer (D), wherein the styrene-unsaturated dicarboxylic acid copolymer (D) comprises 50 to 80% by mass of a styrene monomer unit (d1), 10 to 30% by mass of an unsaturated dicarboxylic anhydride monomer unit (d2), and 5 to 30% by mass of a vinyl monomer unit (d3); and Resin Composition (B3)

A resin composition comprising 95 to 45% by mass of a polycarbonate resin (E) and 5 to 55% by mass of a (meth) acrylate copolymer (F), wherein the (meth)acrylate copolymer (F) comprises an aromatic (meth)acrylate unit (f1) and a methacrylic acid ester monomer unit (f2) at a mass ratio (f1/f2) of 10 to 50/40 to 90, the weight average molecular weight of the polycarbonate resin (E) is 37,000 to 71,000, and the weight average molecular weight of the (meth) acrylate copolymer (F) is 5,000 to 30,000;
(iii) the retardation of the front panel is 3,000 nm or more; and
(iv) the standard deviation of the second derivative of the irregular shape of the hard coat layer having irregularities is 0.1 or more.
<2> The front panel for on-board liquid crystal displays according to <1>, wherein the front panel has another hard coat layer on a side opposite to the hard coat layer having irregularities.

<3> The front panel for on-board liquid crystal displays according to <1> or <2>, wherein the front panel has a warpage change of 1,000 μm or less after being kept for 120 hours in an environment involving a temperature of 85° C. and a relative humidity of 85%.
<4> The front panel for on-board liquid crystal displays according to any of <1> to <3>, wherein the layer containing a high hardness resin composition (B) is prepared by coextrusion with the layer containing a resin (A) comprising a polycarbonate resin (a1).
<5> The front panel for on-board liquid crystal displays according to any of <1> to <4>, wherein the polycarbonate resin (a1) comprises a component derived from a monohydric phenol represented by the following general formula (4):

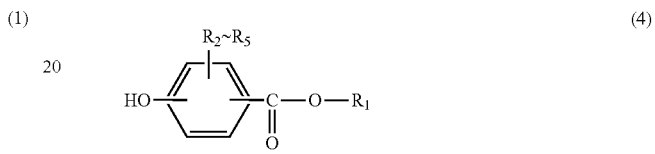

(4)

wherein $R_1$ represents an alkyl group having 8 to 36 carbon atoms or an alkenyl group having 8 to 36 carbon atoms, $R_2$ to $R_5$ each independently represent a hydrogen atom, halogen, an alkyl group having 1 to 20 carbon atoms which optionally has a substituent, or an aryl group having 6 to 12 carbon atoms which optionally has a substituent, and the substituent is halogen, an alkyl group having 1 to 20 carbon atoms, or an aryl group having 6 to 12 carbon atoms.

Advantageous Effect of the Invention

According to a preferred embodiment, the present invention can provide a front panel that prevents glare, has high abrasion resistance, also has high pencil hardness, and is also excellent in the inhibition of warpage, while exhibiting excellent impact resistance, heat resistance and anti-glare performance, and is suitable for on-board liquid crystal displays.

BRIEF DESCRIPTION OF THE DRAWINGS

FIG. 1 shows an example of an irregular shape favorable in terms of glare, obtained in Example 1.
FIG. 2 shows an example of an irregular shape unfavorable in terms of glare, obtained in Comparative Example 1.
FIG. 3 shows an example of the second derivative of the irregular shape favorable in terms of glare, obtained in Example 1.
FIG. 4 shows an example of the second derivative of the irregular shape unfavorable in terms of glare, obtained in Comparative Example 1.

EMBODIMENTS FOR CARRYING OUT THE INVENTION

Hereinafter, the present invention will be described in detail with reference to Production Examples, Examples, etc. However, the present invention is not limited by illustrated Production Examples, Examples, etc. Changes can be made therein in any way as far as they do not largely depart from the contents of the present invention.

The front panel for on-board liquid crystal displays of the present invention is provided with a layer containing a high hardness resin composition (B) (hereinafter, sometimes referred to as a "high hardness layer") and a hard coat layer having irregularities on at least one side of a layer containing a resin (A) comprising a polycarbonate resin (a1) (hereinafter, sometimes referred to as a "base material layer"). The base material layer may be a layer consisting of the resin (A) comprising a polycarbonate resin (a1). The high hardness layer may be a layer consisting of the high hardness resin composition (B). As for the order of lamination, the high hardness layer resides between the base material layer and the hard coat layer, and the outermost surface of the hard coat layer serving as an outermost surface layer is provided with an irregular shape. The other side of the layer containing a resin (A) comprising a polycarbonate resin (a1) is not particularly specified and may be provided with both or any one of a high hardness resin layer and a hard coat layer. In this case, for the high hardness resin layer, it is desirable to use a resin selected from the high hardness resin composition (B), and it is more desirable to use the same high hardness resin composition (B) on both sides, also for decreasing warpage. The hard coat layer is not particularly specified, and a hard coat layer similar to the hard coat layer having irregularities can be used. Hard coat layers formed on both sides can decrease warpage and are therefore more desirable. The pencil hardness of the hard coat layer having irregularities is desirably H or higher, more desirably 2H or higher, particularly desirably 3H or higher, for the prevention of scratches.

The front panel of the present invention can be used alone as a front panel and may be used as a composite front panel, for example, by lamination with another substrate such as a touch sensor.

In the liquid crystal display, the backlight source is not particularly limited and is preferably a white light emitting diode (white LED). The white LED is particularly preferably an element emitting white light by a phosphor system, i.e., combining a phosphor with a light emitting diode that emits blue light or ultraviolet light using a compound semiconductor. In this case, use of the front panel of the present invention can suppress the retardation of the layer containing a resin (A) comprising a polycarbonate resin (a1) and the occurrence of staining and color unevenness attributed to variations in the retardation, when polarized sunglasses or the like are used.

In the liquid crystal display, the driving system is not particularly limited, and a TN (Twisted Nematic) system, a VA (Vertical Alignment) system, an IPS (In-Place-Switching) system, or the like can be used. In a desirable configuration, the transmission axis of a front polarizing plate of the liquid crystal panels is parallel to or forms an angle of 45 degrees with respect to the in-plane fast axis or slow axis of the layer containing a resin (A) comprising a polycarbonate resin (a1). This can suppress the retardation of the layer containing a resin (A) comprising a polycarbonate resin (a1) and the generation of interference color attributed to variations in the retardation, when polarized sunglasses or the like are used.

Hereinafter, each member constituting the front panel for on-board liquid crystal displays according to the present invention will be described.

(Resin (A) Comprising Polycarbonate Resin (a1))

The resin (A) comprising a polycarbonate resin (a1), used in the present invention is a resin mainly comprising the polycarbonate resin (a1). The content of the polycarbonate resin (a1) in the resin (A) is 75% by weight or more. An increased content improves impact resistance. Therefore, the content is desirably 90% by weight or more, more desirably 100% by weight.

The polycarbonate resin (a1) is not particularly limited as long as its molecular backbone contains a carbonic acid ester bond, i.e., a —[O—R—OCO]— unit (R includes an aliphatic group or an aromatic group, or both an aliphatic group and an aromatic group and further has a linear structure or a branched structure). It is particularly preferred to use a polycarbonate resin having a structural unit of the formula (3) given below. Use of such a polycarbonate resin can produce a resin laminate excellent in impact resistance.

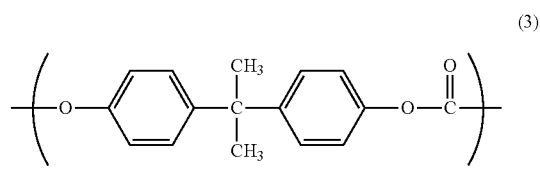

(3)

Specifically, an aromatic polycarbonate resin (e.g., manufactured by Mitsubishi Engineering-Plastics Corp., trade name: Lupilon S-2000, Lupilon S-1000, and Lupilon E-2000) or the like may be used as the polycarbonate resin (a1).

In recent years, there has been a growing demand for also performing bending work in front panels. Therefore, for the polycarbonate resin (a1), it is preferred to use a monohydric phenol represented by the following general formula (4) as a chain terminator.

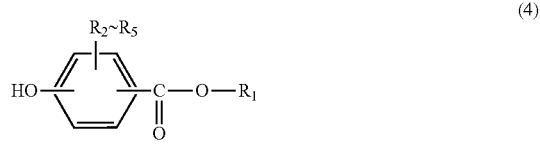

(4)

wherein $R_1$ represents an alkyl group having 8 to 36 carbon atoms or an alkenyl group having 8 to 36 carbon atoms, $R_2$ to $R_5$ each independently represent a hydrogen atom, halogen, an alkyl group having 1 to 20 carbon atoms which optionally has a substituent, or an aryl group having 6 to 12 carbon atoms which optionally has a substituent, and the substituent is halogen, an alkyl group having 1 to 20 carbon atoms, or an aryl group having 6 to 12 carbon atoms.

More preferably, the monohydric phenol represented by the general formula (4) is represented by the following general formula (5):

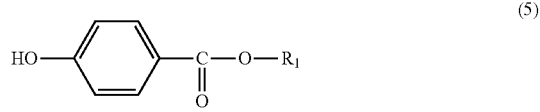

(5)

wherein $R_1$ represents an alkyl group having 8 to 36 carbon atoms or an alkenyl group having 8 to 36 carbon atoms.

The number of carbon atoms of $R_1$ in the general formula (4) or (5) more preferably falls within a specific numerical range.

Specifically, the upper limit of the number of carbon atoms of $R_1$ is preferably 36, more preferably 22, particularly preferably 18. The lower limit of the number of carbon atoms of $R_1$ is preferably 8, more preferably 12.

Among the monohydric phenols (chain terminator) represented by the general formula (4) or (5), any or both of p-hydroxybenzoic acid hexadecyl ester and p-hydroxybenzoic acid 2-hexyldecyl ester is particularly preferably used as a chain terminator.

In the case of using a monohydric phenol (chain terminator) wherein $R_1$ is, for example, an alkyl group having 16 carbon atoms, the resulting chain terminator is excellent in glass transition temperature, melt flowability, moldability, draw down resistance, and solvent solubility of the monohydric phenol in the production of the polycarbonate resin, and is thus particularly preferably used in the polycarbonate resin according to the present invention.

On the other hand, if $R_1$ in the general formula (4) or (5) has too large a number of carbon atoms, the resulting monohydric phenol (chain terminator) tends to have low organic solvent solubility. This may reduce the productivity of the polycarbonate resin production.

As one example, $R_1$ having 36 or less carbon atoms offers high productivity and also good economic efficiency in producing the polycarbonate resin. The monohydric phenol having $R_1$ having 22 or less carbon atoms is excellent, particularly, in organic solvent solubility, and can very highly enhance productivity and also improves economic efficiency in producing the polycarbonate resin.

If $R_1$ in the general formula (4) or (5) has too small a number of carbon atoms, the resulting polycarbonate resin does not have a sufficiently low glass transition temperature. This may reduce thermal moldability.

In the present invention, the weight average molecular weight of the polycarbonate resin (a1) influences the impact resistance and molding conditions of a synthetic resin laminate. Specifically, too small a weight average molecular weight reduces the impact resistance of a synthetic resin laminate and is therefore not preferred. Too high a weight average molecular weight may require an excessive heat source for laminating a layer containing the polycarbonate resin (a1) and is thus not preferred. Some molding methods require a high temperature and therefore cause the polycarbonate resin (a1) to be exposed to the high temperature. This may adversely affect its heat stability. The weight average molecular weight of the polycarbonate resin (a1) is preferably 15,000 to 75,000, more preferably 20,000 to 70,000, further preferably 25,000 to 65,000. The weight average molecular weight is a weight average molecular weight based on standard polystyrene, measured by gel permeation chromatography (GPC), as described in Examples mentioned later.

(High Hardness Resin Composition (B))

The high hardness resin composition (B) used in the present invention is any one selected from a resin composition (B1), a resin composition (B2), and a resin composition (B3).

(Resin Composition (B1))

The resin composition (B1) used in the present invention is a copolymer resin comprising a (meth)acrylic acid ester constituent unit (a) represented by the general formula (1), and an aliphatic vinyl constituent unit (b) represented by the general formula (2), wherein the total ratio of the methacrylic acid ester constituent unit (a) and the aliphatic vinyl constituent unit (b) is 90 to 100 mol % of all constituent units of the copolymer resin, and the ratio of the methacrylic acid ester constituent unit (a) is 65 to 80 mol % of all constituent units of the copolymer resin.

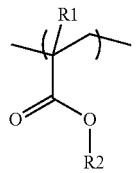

wherein R1 is a hydrogen atom or a methyl group, and R2 is an alkyl group having 1 to 18 carbon atoms.

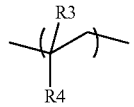

wherein R3 is a hydrogen atom or a methyl group, and R4 is a cyclohexyl group optionally having a hydrocarbon group having 1 to 4 carbon atoms.

In the (meth)acrylic acid ester constituent unit (a) represented by the general formula (1), R2 is an alkyl group having 1 to 18 carbon atoms. Specific examples thereof include a methyl group, an ethyl group, a butyl group, a lauryl group, a stearyl group, a cyclohexyl group, and an isobornyl group.

The (meth)acrylic acid ester constituent unit (a) is preferably a (meth)acrylic acid ester constituent unit wherein R2 is a methyl group or an ethyl group, more preferably a methyl methacrylate constituent unit wherein R1 is a methyl group, and R2 is a methyl group.

Preferred examples of the aliphatic vinyl constituent unit (b) represented by the general formula (2) include aliphatic vinyl constituent units wherein R3 is a hydrogen atom or a methyl group, and R4 is a cyclohexyl group or a cyclohexyl group having a hydrocarbon group having 1 to 4 carbon atoms.

The aliphatic vinyl constituent unit (b), is more preferably an aliphatic vinyl constituent unit wherein R3 is a hydrogen atom, and R4 is a cyclohexyl group.

The resin composition (B1) may contain one or two or more of the (meth)acrylic acid ester constituent units (a) and may contain one or two or more of the aliphatic vinyl constituent units (b).

The total ratio of the (meth)acrylic acid ester constituent unit (a) and the aliphatic vinyl constituent unit (b) is 90 to 100 mol %, preferably 95 to 100 mol %, more preferably 98 to 100 mol %, with respect to the total of all constituent units of the copolymer resin.

Specifically, the resin composition (B1) may contain a constituent unit other than the (meth)acrylic acid ester constituent unit (a) and the aliphatic vinyl constituent unit (b), in the range of 10 mol % or less with respect to the total of all constituent units of the copolymer resin.

Examples of the constituent unit other than the (meth)acrylic acid ester constituent unit (a) and the aliphatic vinyl constituent unit (b) include a constituent unit derived from an aromatic vinyl monomer containing an unhydrogenated aromatic double bond in a resin composition (B1) obtained by hydrogenating aromatic vinyl monomer-derived aromatic double bonds after polymerization of (meth)acrylic acid ester and aromatic vinyl monomers.

The ratio of the (meth)acrylic acid ester constituent unit (a) represented by the general formula (1) is 65 to 80 mol %, preferably 70 to 80 mol %, with respect to the total of all constituent units in the resin composition (B1). If the ratio of the (meth)acrylic acid ester constituent unit (a) is less than 65 mol % with respect to the total of all constituent units in the resin composition (B1), the resulting resin composition (B1) may not be practical due to reduced close contact with the resin (A) comprising a polycarbonate resin (a1), or surface hardness. If the ratio exceeds 80 mol %, the resulting resin composition (B1) may not be practical due to the occurrence of warpage by the water absorption of a laminate.

A method for producing the resin composition (B1) is not particularly limited. The resin composition (B1) is suitably obtained by polymerizing at least one (meth)acrylic acid ester monomer and at least one aromatic vinyl monomer and then hydrogenating aromatic double bonds derived from the aromatic vinyl monomer. The (meth)acrylic acid refers to methacrylic acid and/or acrylic acid.

Specific examples of the aromatic vinyl monomer used in this operation include styrene, α-methylstyrene, p-hydmoxystyrene, alkoxystyrene, chlorostyrene, and their derivatives. Among them, styrene is preferred.

A known method can be used in the polymerization of the (meth)acrylic acid ester monomer and the aromatic vinyl monomer. For example, the resin composition (B1) can be produced by, for example, a bulk polymerization method or a solution polymerization method.

The bulk polymerization method involves continuously supplying a monomer composition containing the monomers described above and a polymerization initiator to a complete mixing vessel where continuous polymerization is performed at 100 to 180° C. The monomer composition may optionally contain a chain transfer agent, if necessary.

Examples of the polymerization initiator include, but are not particularly limited to: organic peroxides such as t-amyl peroxy-2-ethylhexanoate, t-butyl peroxy-2-ethylhexanoate, benzoyl peroxide, 1,1-di(t-hexylperoxy)-3,3,5-trimethylcyclohexane, 1,1-di(t-hexylperoxy)cyclohexane, 1,1-di(t-butylperoxy)cyclohexane, t-hexyl propoxy isopropyl monocarbonate, t-amyl peroxy normal octoate, t-butylperoxyisopropyl monocarbonate, and di-t-butyl peroxide; and azo compounds such as 2,2'-azobisisobutyronitrile, 2,2'-azobis(2-methylbutyronitrile), and 2,2'-azobis(2,4-dimethylvaleronitrile). These polymerization initiators can be used alone or in combination of two or more thereof.

A chain transfer agent is used, if necessary. Examples thereof include α-methylstyrene dimers.

Examples of the solvent for use in the solution polymerization method include: hydrocarbon solvents such as toluene, xylene, cyclohexane, and methylcyclohexane; ester solvents such as ethyl acetate and methyl isobutyrate; ketone solvents such as acetone and methyl ethyl ketone; ether solvents such as tetrahydrofuran and dioxane; and alcohol solvents such as methanol and isopropanol.

The solvent for use in the hydrogenation reaction after the polymerization of the (meth)acrylic acid ester monomer and the aromatic vinyl monomer may be the same as or different from the polymerization solvent. Examples thereof include: hydrocarbon solvents such as cyclohexane and methylcyclohexane; ester solvents such as ethyl acetate and methyl isobutyrate; ketone solvents such as acetone and methyl ethyl ketone; ether solvents such as tetrahydrofuran and dioxane; and alcohol solvents such as methanol and isopropanol.

After the polymerization of the (meth)acrylic acid ester monomer and the aromatic vinyl monomer, aromatic double bonds derived from the aromatic vinyl monomer are hydrogenated, as described above, to obtain the resin composition (B1) used in the present invention.

The hydrogenation method is not particularly limited, and a known method can be used. The hydrogenation can be performed by, for example, a batch system or a continuous flow system at a hydrogen pressure of 3 to 30 MPa at a reaction temperature of 60 to 250° C. At the temperature of 60° C. or higher, the reaction time is not too long. At the temperature of 250° C. or lower, the cleavage of molecular chains or hydrogenation at ester sites is less likely to occur.

Examples of the catalyst for use in the hydrogenation reaction include solid catalysts in which a metal such as nickel, palladium, platinum, cobalt, ruthenium, or rhodium, or an oxide, a chloride, or a complex compound of the metal is supported by a porous support such as carbon, alumina, silica, silica-alumina, or diatomaceous earth.

For the resin composition (B1), it is preferred that 70% or more of aromatic double bonds derived from the aromatic vinyl monomer be hydrogenated. Specifically, the ratio of an unhydrogenated aromatic double bond site in the constituent unit derived from the aromatic vinyl monomer is preferably 30% or less. If this ratio falls within the range exceeding 30%, the transparency of the resin composition (B1) may be reduced. The ratio of the unhydrogenated site is more preferably in the range of less than 10%, further preferably in the range of less than 5%.

The weight average molecular weight of the resin composition (B1) is not particularly limited and is preferably 50,000 to 400,000, more preferably 70,000 to 300,000, from the viewpoint of strength and moldability.

The weight average molecular weight is a weight average molecular weight based on standard polystyrene, measured by gel permeation chromatography (GPC), as described in Examples mentioned later.

The resin composition (B1) can be blended with an additional resin to the extent that transparency is not impaired. Examples thereof include methyl methacrylate-styrene copolymer resins, polymethyl methacrylate, polystyrene, polycarbonate, cycloolefin (co)polymer resins, acrylonitrile-styrene copolymer resins, acrylonitrile-butadiene-styrene copolymer resins, and various elastomers.

The glass transition temperature of the resin composition (B1) is preferably in the range of 110 to 140° C. When the glass transition temperature is 110° C. or higher, the laminate provided by the present invention is less prone to be deformed or cracked in a heat environment or a hot and humid environment. When the glass transition temperature is 140° C. or lower, the laminate is excellent in workability of continuous thermal shaping using mirror rolls or shaping rolls or batch thermal shaping using a mirror die or a shaping die, etc. The glass transition temperature according to the present invention is a temperature calculated by a midpoint method as to 10 mg of a sample measured at a temperature increase rate of 10° C./min using a differential scanning calorimetry apparatus.

(Resin Composition (B2))

The resin composition (B2) used in the present invention is a resin composition comprising 55 to 10% by mass (preferably 50 to 20% by mass) of a resin (C) containing a vinyl monomer and 45 to 90% by mass (preferably 50 to 80% by mass) of a styrene-unsaturated dicarboxylic acid copolymer (D), wherein the styrene-unsaturated dicarboxylic acid copolymer (D) comprises 50 to 80% by mass of a styrene monomer unit (d1), 10 to 30% by mass of an unsaturated dicarboxylic anhydride monomer unit (d2), and 5 to 30% by mass of a vinyl monomer unit (d3).

Hereinafter, the resin (C) containing a vinyl monomer and the styrene-unsaturated dicarboxylic acid copolymer (D) will be described in order.

<Resin (C) Containing Vinyl Monomer>

Examples of the resin (C) containing a vinyl monomer, used in the present invention include homopolymers of vinyl monomers such as acrylonitrile, methacrylonitrile, acrylic acid, methyl acrylate, ethyl acrylate, n-butyl acrylate, 2-ethylhexyl acrylate, methacrylic acid, methyl methacrylate, ethyl methacrylate, n-butyl methacrylate, and 2-ethylhexyl methacrylate. Particularly, methyl methacrylate is preferred as a monomer unit. Alternatively, a copolymer containing two or more types of the monomer units may be used.

The weight average molecular weight of the resin (C) containing a vinyl monomer is preferably 10,000 to 500,000, more preferably 50,000 to 300,000.

<Styrene-Unsaturated Dicarboxylic Acid Copolymer (D)>

The styrene-unsaturated dicarboxylic acid copolymer (D) used in the present invention comprises a styrene monomer unit (d1), an unsaturated dicarboxylic anhydride monomer unit (d2), and a vinyl monomer unit (d3).

<Styrene Monomer Unit (d1)>

The styrene monomer is not particularly limited, and any known styrene monomer can be used. Examples thereof include styrene, α-methylstyrene, o-methylstyrene, m-methylstyrene, p-methylstyrene, and t-butylstyrene, from the viewpoint of easy availability. Among them, styrene is particularly preferred from the viewpoint of compatibility. Two or more of these styrene monomers may be mixed.

<Unsaturated dicarboxylic anhydride monomer unit (d2)>

Examples of the unsaturated dicarboxylic anhydride monomer include acid anhydrides such as maleic anhydride, itaconic anhydride, citraconic anhydride, and aconitic anhydride. Maleic anhydride is preferred from the viewpoint of compatibility with the vinyl monomer. Two or more of these unsaturated dicarboxylic anhydride monomers may be mixed.

<Vinyl Monomer Unit (d3)>

Examples of the vinyl monomer include vinyl monomers such as acrylonitrile, methacrylonitrile, acrylic acid, methyl acrylate, ethyl acrylate, n-butyl acrylate, 2-ethylhexyl acrylate, methacrylic acid, methyl methacrylate, ethyl methacrylate, n-butyl methacrylate, and 2-ethylhexyl methacrylate. Methyl methacrylate (MMA) is preferred from the viewpoint of compatibility with the resin (C) containing a vinyl monomer. Two or more of these vinyl monomers may be mixed.

<Compositional Ratio of Styrene-Unsaturated Dicarboxylic Acid Copolymer (D)>

The compositional ratio of the styrene-unsaturated dicarboxylic acid copolymer (D) is 50 to 80% by mass (preferably 50 to 75% by mass) of the styrene monomer unit (d1), 10 to 30% by mass (preferably 10 to 25% by mass) of the unsaturated dicarboxylic anhydride monomer unit (d2), and 5 to 30% by mass (preferably 7 to 27% by mass) of the vinyl monomer unit (d3).

The weight average molecular weight of the styrene-unsaturated dicarboxylic acid copolymer (D) is preferably 50,000 to 200,000, more preferably 80,000 to 200,000. The styrene-unsaturated dicarboxylic acid copolymer (D) having a weight average molecular weight of 50,000 to 200,000 has favorable compatibility with the resin (C) containing a vinyl monomer and is excellently effective for improving heat resistance. The weight average molecular weight of the resin (C) or the copolymer (D) is a weight average molecular weight based on standard polystyrene, measured by gel permeation chromatography (GPC), as described in Examples mentioned later.

(Resin Composition (B3))

The resin composition (B3) used in the present invention is a resin composition comprising 95 to 45% by mass of a polycarbonate resin (E) and 5 to 55% by mass of a (meth)acrylate copolymer (F), wherein the (meth)acrylate copolymer (F) comprises an aromatic (meth)acrylate unit (f1) and a methacrylic acid ester monomer unit (f2) at a mass ratio (f1/2) of 10 to 50/40 to 90, the weight average molecular weight of the polycarbonate resin (E) is 37,000 to 71,000, and the weight average molecular weight of the (meth)acrylate copolymer (F) is 5,000 to 30,000.

The polycarbonate resin (E) is not particularly limited as long as its molecular backbone contains a —[O—R—OCO]— unit (R includes an aliphatic group or an aromatic group, or both an aliphatic group and an aromatic group and further has a linear structure or a branched structure) containing a carbonic acid ester bond.

The (meth)acrylate copolymer (F) used in the present invention consists of an aromatic (meth)acrylate unit (f1) and a methacrylic acid ester monomer unit (12). In the present invention, the (meth)acrylate refers to acrylate or methacrylate.

The aromatic (meth)acrylate constituting the aromatic (meth)acrylate unit (f1) refers to a (meth)acrylate having an aromatic group at an ester moiety. Examples of the aromatic (meth)acrylate can include phenyl (meth)acrylate and benzyl (meth)acrylate. These aromatic (meth)acrylates can be used alone or in combination of two or more thereof. Among them, phenyl methacrylate or benzyl methacrylate is preferred, and phenyl methacrylate is more preferred. The presence of the aromatic (meth)acrylate unit (f1) can improve the transparency of a molded article of a mixture with the aromatic polycarbonate resin.

The monomer constituting the methacrylic acid ester monomer unit (12) is methyl methacrylate. The methacrylic acid ester monomer unit (f2) is effective for achieving good dispersion with the polycarbonate resin and can improve the surface hardness of a molded article because of migrating to the molded article surface.

The (meth)acrylate copolymer (F) contains 10 to 50% by mass (preferably 20 to 40% by mass) of the aromatic (meth)acrylate unit (f1) and 40 to 90% by mass (preferably 50 to 80% by mass) of the methacrylic acid ester monomer unit (12), with respect to 100% by mass in total of the units (f1) and (12). When the content of the aromatic (meth)acrylate unit (f1) in the (meth)acrylate copolymer (F) is 10% by mass or more, transparency is maintained in a region supplemented with a high amount of the (meth)acrylate copolymer (F). When the content is 50% by mass or less, the surface hardness of a molded article is not reduced because compatibility with the polycarbonate is not too high and migration to the molded article surface is not reduced.

The weight average molecular weight of the (meth)acrylate copolymer (F) is 5,000 to 30,000, preferably 10,000 to 25,000. The (meth)acrylate copolymer (F) having a weight average molecular weight of 5,000 to 30,000 has favorable compatibility with the polycarbonate and is excellently effective for improving surface hardness.

In the present invention, the compositional ratio between the (meth)acrylate copolymer (F) and the polycarbonate resin (E) is 95 to 45% by mass of the component (E) with respect to 5 to 55% by mass of the component (F), preferably 80 to 50% by mass of the component (E) with respect to 20 to 50% by mass of the component (F), more preferably 70 to 50% by mass of the component (E) with respect to 30 to 50% by mass of the component (F). Within this range of the compositional ratio, the high hardness resin composition (B) achieves the balance between surface hardness and physical properties such as impact resistance or a water absorption rate while maintaining transparency.

In the present invention, the weight average molecular weight of the polycarbonate resin (E) depends on the ease of mixing (dispersion) with the (meth)acrylate copolymer (F). Specifically, if the polycarbonate resin (E) has too large a weight average molecular weight, the component (E) and the component (F) are poorly mixed (dispersed) due to too large a difference in melt viscosity between the component (E) and the component (F). Thus, transparency is deteriorated. Alternatively, there arises a trouble in such a way that stable melt kneading cannot be continued. On the other hand, if the polycarbonate resin (E) has too small a weight average molecular weight, the layer containing a high hardness resin composition (B) has low strength. Therefore, there arises a problem in such a way that the impact resistance of a synthetic resin laminate is reduced.

The weight average molecular weight of the polycarbonate resin (E) is in the range of 37,000 to 71,000, preferably in the range of 42,000 to 68,000, more preferably in the range of 48,000 to 64,000. The weight average molecular weight of the polycarbonate resin (E) and the (meth)acrylate copolymer (F) is a weight average molecular weight based on standard polystyrene, measured by gel permeation chromatography (GPC), as described in Examples mentioned later.

(Laminate)

A method for producing a laminate having the layer containing a high hardness resin composition (B) on at least one side of the layer containing a resin (A) comprising a polycarbonate resin (a1), in the front panel used in the present invention is not particularly limited. Examples thereof include various methods such as a method which involves laminating the individually formed layer containing a high hardness resin composition (B) and layer containing a resin (A) comprising a polycarbonate resin (a1), and pressure-bonding these layers together by heating, a method which involves laminating the individually formed layer containing a high hardness resin composition (B) and layer containing a resin (A) comprising a polycarbonate resin (a1), and adhering these layers together using an adhesive, a method which involves coextrusion-molding the layer containing a high hardness resin composition (B) and the resin (A) comprising a polycarbonate resin (a1), and a method which involves integrating the resin (A) comprising a polycarbonate resin (a1) with the preformed layer containing a high hardness resin composition (B) by in-mold molding. A method involving coextrusion molding is preferred from the viewpoint of production cost and productivity.

The coextrusion method is not particularly limited. For example, in a feed block system, the layer containing a high hardness resin composition (B) is laminated on one side of the layer containing a resin (A) comprising a polycarbonate resin (a1), in the feed block, and the laminate is extruded into a sheet by a T die. Then, the sheet is cooled while allowed to pass through molding rolls, to form the desired laminate. Alternatively, in a multi-manifold system, the layer containing a high hardness resin composition (B) is laminated on one side of the layer containing a resin (A) comprising a polycarbonate resin (a1), within the multi-manifold die, and the laminate is extruded into a sheet. Then, the sheet is cooled while allowed to pass through molding rolls, to form the desired synthetic resin laminate.

The resin (A) comprising a polycarbonate resin (a1) and the high hardness resin composition (B) according to the present invention can be used by mixing with various additives to the extent that transparency is not impaired. Examples of the additives include antioxidants, anti-stain agents, antistatic agents, mold release agents, lubricants, dyes, and pigments. The mixing method is not particularly limited. For example, a method of compounding the whole amount, a method of dry-blending a master batch, or a method of dry-blending the whole amount can be used.

The thickness of the layer containing a high hardness resin composition (B) influences the surface hardness and impact resistance of the synthetic resin laminate. Specifically, too small a thickness reduces the surface hardness and is thus not preferred. Too large a thickness deteriorates the impact resistance and is thus not preferred. The thickness of the layer containing a high hardness resin composition (B) is 10 to 250 µmin, preferably 30 to 200 µm, more preferably 60 to 150 µm.

In the present invention, the total thickness of the layer containing a resin (A) comprising a polycarbonate resin (a1) and the layer containing a high hardness resin composition (B) influences warpage after the front panel is left in a high temperature and high humidity environment. Specifically, a front panel having too small a total thickness has larger warpage after being left in a high temperature and high humidity environment. A front panel having too large a total thickness has smaller warpage after being left in a high temperature and high humidity environment. Thus, the total thickness of the layer containing a resin (A) comprising a polycarbonate resin (a1) and the layer containing a high hardness resin composition (B) is 100 to 3,000 µm, preferably 120 to 2,500 µm, more preferably 150 to 2,000 µm.

(Retardation)

The retardation of the front panel according to the present invention is 3,000 nm or more, preferably 4,000 nm or more, for preventing a blackout phenomenon. The retardation is more preferably 5,000 nm or more, particularly preferably 6,000 nm or more. A front panel having a retardation lower than 3,000 nm is not sufficiently effective for preventing the blackout phenomenon. Although there is no particular upper limit of the retardation, a retardation of 15,000 nm or more is sufficient for preventing the blackout phenomenon but increases deformation under a severe environment such as the inside of cars. Therefore, the retardation is desirably 15,000 nm or less, more preferably 14,000 nm or less, particularly preferably 12,000 nm or less.

In this context, the "retardation" according to the present invention refers to a value of (nx−ny)×d indicated by nm unit, wherein nx represents the principal refractive index of the in-plane slow axis of a sheet, ny represents the principal refractive index of the in-plane fast axis thereof, and d represents the thickness of the sheet.

A production method for adjusting the retardation to 3,000 nm or more is not particularly limited. For example, the retardation of the layer containing a resin (A) comprising a polycarbonate resin (a1) can be increased by increasing a take-off speed and thereby the draw ratio in the flow direction of the polycarbonate resin. As a result, the retardation of the front panel can be adjusted to 3,000 nm or more.

(Hard Coat Layer Having Irregularities)

In the front panel according to the present invention, a hard coat layer is formed on the layer containing a high hardness resin composition (B), so as not to be damaged upon handling. For example, the hard coat layer is formed by hard coat treatment using a coating material for hard coats curable using thermal energy and/or light energy. Examples of the coating material for hard coats curable using thermal energy include thermosetting resin compositions such as polyorganosiloxane resin compositions and cross-linkable acrylic resin compositions. Examples of the coating material for hard coats curable using light energy include a photocurable resin composition containing 1 to 10 parts by weight of a photopolymerization initiator (a23) added to 100 parts by weight of a resin composition consisting of 40 to 80% by weight of tris(acryloxyethyl) isocyanurate (a21) and 20 to 40% by weight of a bifunctional and/or trifunctional (meth) acrylate compound (a22) copolymerizable with the component (a21).

Another example of the coating material for hard coats curable using light energy include a photocurable resin composition containing 1 to 10 parts by mass of a photopolymerization initiator added to 100 parts by mass of a resin composition consisting of 20 to 60% by mass of 1,9-nonanediol diacrylate and 40 to 80% by mass of a compound consisting of a bifunctional or higher polyfunctional (meth)acrylate monomer and a bifunctional or higher polyfunctional urethane (meth)acrylate oligomer and/or a bifunctional or higher polyfunctional polyester (meth)acrylate oligomer and/or a bifunctional or higher polyfunctional epoxy (meth)acrylate oligomer, copolymerizable with the 1,9-nonanediol diacrylate.

The film thickness of the hard coat layer is desirably 1 µm or larger and 40 µm or smaller, more desirably 2 µm or larger and 10 µm or smaller. A film thickness of less than 1 µm reduces pencil hardness. A film thickness exceeding 40 µm increases warpage. The film thickness of the hard coat layer can be measured by observing the cross section under a microscope or the like and actually measuring the distance from the coat interface to the surface.

The surface to be coated may be pretreated before the hard coat treatment for the purpose of improving the close contact of the hard coat layer therewith. Examples of the pretreatment include known methods such as a sand blast method, a solvent treatment method, a corona discharge treatment method, a chromic acid treatment method, a flame treatment method, a hot air treatment method, an ozone treatment method, an ultraviolet treatment method, and a primer treatment method with a resin composition.

The surface of the hard coat layer has an irregular shape in order to impart anti-glare properties. The irregular shape according to the present invention means that center line average roughness (Ra) defined in JIS-B-0601 is 0.01 or more. For obtaining high anti-glare properties, the center line average roughness (Ra) is desirably 0.05 or more.

Further, for the irregular shape according to the present invention, the standard deviation of the second derivative of the irregular shape of the hard coat layer is 0.10 or more, more desirably 0.125 or more, further preferably 0.13 or more, particularly preferably 0.15 or more. If the standard deviation is smaller than 0.10, there arises a problem in such a way that glare occurs easily. A method for calculating the standard deviation of the second derivative of the irregular shape of the hard coat layer according to the present invention is as follows.

The irregular shape can be measured under a confocal microscope (e.g., OLYMPUS scanning confocal laser microscope LEXT OLS3100). Three-dimensional shape measurement is performed at a visual magnification set to ×500 and a step size of 0.01 µm in the Z direction. A line profile in the X direction at an arbitrary position is used as the irregular shape. Data in the X direction is obtained at a step size of 0.25 µm. The standard deviation of the second derivative is calculated using Excel. The derivative employs the SLOPE function of Excel. A slope of a straight line of 7 points calculated with the SLOPE function is used as the first derivative. An example of entry of the SLOPE function when column A is the X coordinate (unit: µm) and column B is the Z coordinate (unit: µm) is shown in column C given below. The first derivative is performed twice for the calculation of the second derivative. FIGS. 1 and 2 show examples of irregular shapes obtained in Example 1 and Comparative Example 1, respectively. FIGS. 3 and 4 show results of calculating the respective second derivatives by the method mentioned above. The value of the second derivative is defined as a population, and the standard deviation is calculated. The obtained results correspond to the standard deviation of the second derivative of the irregular shape. In the present invention, an average of standard deviations calculated at 4 sites per sample is used.

TABLE 1

|   | A | B | C |
|---|---|---|---|
| 1 | 0 | 4.86 | |
| 2 | 0.25 | 4.93 | |
| 3 | 0.5 | 4.93 | |
| 4 | 0.75 | 4.91 | =SLOPE(B1:B7, A1:A7) |
| 5 | 1 | 4.87 | =SLOPE(B2:B8, A2:A8) |
| 6 | 1.25 | 4.92 | =SLOPE(B3:B9, A3:A9) |
| 7 | 1.5 | 4.94 | ⋮ |
| 8 | 1.75 | 4.99 | ⋮ |
| 9 | 2 | 5.14 | ⋮ |
| 10 | ⋮ | ⋮ | ⋮ |

A method for applying the coating material for hard coats according to the present invention is not particularly limited, and a known method can be used. Examples thereof include a spin coating method, a dipping method, a spray method, a slide coating method, a bar coating method, a roll coating method, a gravure coating method, a meniscus coating method, a flexographic printing method, a screen printing method, a beat coating method, and a brushing method.

Examples of the method forming the irregularities include molding using a mold and coat formation by coating. In the molding using a mold, the irregularities can be produced by, for example, a method which involves preparing a mold having a shape complementary to the irregular surface, and ultraviolet-curing an ultraviolet curable resin applied on a transparent base material in close contact with the mold. In the coat formation by coating, the irregularities can be formed by applying an application liquid for irregular layer formation containing a resin component and translucent particles onto a transparent base material by a known application method such as gravure coating or bar coating, followed by drying and curing, if necessary.

EXAMPLES

Hereinafter, the present embodiment will be described in more detail with reference to Examples. However, the present embodiment is not limited by these Examples. The physical property measurement of resins obtained in Production Examples and the evaluation of front panels obtained in Examples and Comparative Examples were performed as follows.

<Weight Average Molecular Weight>

Standard polystyrene was dissolved in chloroform and measured by gel permeation chromatography (GPC) in advance. On the basis of the resulting calibration curve, each sample was measured by GPC in the same way as above. Its weight average molecular weight was calculated by comparison therebetween. The apparatus configuration of GPC is as follows.
Apparatus: Waters 2690
Column: Shodex GPC KF-805L 8ϕ×300 mm, 2 columns connected
Developing solvent: chloroform
Flow rate: 1 ml/min
Temperature: 30° C.
<Shape Stability>

Each test specimen was cut out into 10×6 cm square. The cut-out test specimen was loaded in a two-point support type holder and placed for 24 hours or longer in an environment tester set to a temperature of 23° C. and a relative humidity of 50% for conditioning, followed by warpage measurement (before treatment). Next, the test specimen was loaded in a holder, placed in an environment tester set to a temperature of 85° C. and a relative humidity of 85%, and kept in this state for 120 hours. The test specimen was further transferred, together with the holder, into an environment tester set to a temperature of 23° C. and a relative humidity of 50%, and kept in this state for 4 hours, followed by warpage measurement again (after treatment). The warpage measurement employed a three-dimensional shape measuring machine (KS-1100 manufactured by Keyence Corp.) equipped with a motorized stage. The test specimen taken out of the holder was left standing horizontally with its protruding side facing upward and scanned at 1-mm intervals. A central raised portion was measured as warpage. The absolute value of the difference in the amount of warpage between before and after treatment, i.e.,

|(Amount of warpage after treatment)−(Amount of warpage before treatment)| was evaluated as shape stability. The measurement limit of the measuring machine is 2,000 μm, and a test specimen having warpage beyond the measurement limit was regarded as being immeasurable.
<Pencil Scratch Hardness Test>

Pencils were pressed with gradually increased hardness against the surface of a hard coat layer having irregularities, with an angle of 45 degrees with respect to the surface at a load of 750 g in conformity to JIS K 5600-5-4. The hardness of the hardest pencil that did not leave any scratch mark was evaluated as pencil hardness.
<Glare>

The entire screen of a liquid crystal display was allowed to display a green color. A front panel was placed on the display device and visually observed to confirm the presence or absence of glare.
<Blackout>

The entire screen of a liquid crystal display was allowed to display a white color. A front panel was placed on the display device, and the screen was observed through polarized sunglasses. In this observation, the absorption axis of a polarizing plate on the visible side of the liquid crystal display was allowed to be orthogonal to the absorption axis of the polarized sunglasses (a state that offered a black screen without the front panel thus placed). As a result of the observation, a sample having favorable visibility was evaluated as being good, and a sample having poor visibility was evaluated as being unacceptable.

<Standard Deviation of Second Derivative of Irregular Shape of Hard Coat Layer Having Irregularities>

The surface shape of a patterned hard coat was measured under a confocal microscope (OLYMPUS scanning confocal laser microscope LEXT OLS3100). Three-dimensional shape measurement was performed at a visual magnification set to ×500 and a step size of 0.01 μm in the Z direction. A line profile (length: 255.75 μm) in the X direction at an arbitrary position was used as an irregular shape. Data in the X direction was obtained at a step size of 0.25 μm. The standard deviation of the second derivative was calculated using Excel. The derivative employed the SLOPE function of Excel. A slope of a straight line of 7 points calculated with the SLOPE function was used as the first derivative. The first derivative was performed twice for the calculation of the second derivative. The value of the second derivative was defined as a population, and the standard deviation was calculated. An average of standard deviations calculated at 4 sites per sample was calculated. The average value from the 4 sites was evaluated as the standard deviation of the second derivative of the irregular shape.
<Roughness Ra>

Center line average roughness (Ra) was calculated by the method defined in JIS-B-0601-1994 using a surface roughness measuring machine "SURFCOM 480A" manufactured by Tokyo Seimitsu Co., Ltd.

Production Example 1 [Production of Resin Composition (B1)]

A monomer composition consisting of 77.000 mol % of purified methyl methacrylate (manufactured by Mitsubishi Gas Chemical Co., Inc.), 22.998 mol % of purified styrene (manufactured by Wako Pure Chemical Industries, Ltd.) as an aromatic vinyl monomer, and 0.002 mol % of t-amyl peroxy-2-ethylhexanoate (manufactured by ARKEMA Yoshitomi, Ltd, trade name: Luperox 575) as a polymerization initiator was continuously supplied at 1 kg/h to a 10 L complete mixing vessel with a helical ribbon blade where continuous polymerization was performed at a polymerization temperature of 150° C. for an average retention time of 2.5 hours. The polymerization product was continuously discharged from the bottom with the liquid level of the polymerization vessel kept constant, and introduced into a solvent removal apparatus to obtain pellets of a vinyl copolymer resin (B1-1').

The obtained vinyl copolymer resin (B1-1') was dissolved in methyl isobutyrate (manufactured by Kanto Chemical Co., Inc.) to prepare a 10% by mass solution in methyl isobutyrate. To a 1000 mL autoclave apparatus, 500 parts by mass of the 10% by mass (B1-1') solution in methyl isobutyrate and 1 part by mass of 10% by mass of Pd/C (manufactured by N.E. Chemcat Corp.) were added, and kept at 200° C. at a hydrogen pressure of 9 MPa for 15 hours to hydrogenate the aromatic double bond sites of the vinyl copolymer resin (B1-1'). The catalyst was filtered off, and the residue was introduced into a solvent removal apparatus to obtain pellets of a vinyl copolymer resin (B1-1). As a result of 1H-NMR measurement, the ratio of the methyl methacrylate constituent unit in the vinyl copolymer resin (B1-1) was 75 mol %. As a result of absorbance measurement at a wavelength of 260 nm, the hydrogenation reaction rate of the aromatic double bond sites was 99%. The weight average molecular weight (based on standard polystyrene) measured by gel permeation chromatography was 125,000.

Production Example 2 [Production of Resin Composition (B2)]

50% by mass of R-200 (manufactured by Denka Corp., weight average molecular weight: 185,000, d1:d2:d3=55:

20:25) as a styrene-unsaturated dicarboxylic acid copolymer (D), 50% by mass of methyl methacrylate resin PARAPET HR-L (manufactured by Kuraray Co., Ltd., weight average molecular weight: 90,000) as a resin (C) containing a vinyl monomer, 500 ppm of a phosphorus additive PEP36 (manufactured by Adeka Corp.), and 0.2% of monoglyceride stearate (product name: H-100, manufactured by Riken Vitamin Co., Ltd.) were added. This composition was mixed for 20 minutes using a blender, then melt-kneaded at a cylinder temperature of 240° C. using a twin screw extruder having a screw diameter of 26 mm, and extruded into strands, which were then pelletized in a pelletizer to obtain a resin composition (B2-1). The pellets were able to be stably produced.

Production Example 3 [Production of Resin Composition (B2)]

A resin composition (B2-2) was obtained in the same way as in Production Example 2 except that: 60% by mass of R-200 was used as the styrene-unsaturated dicarboxylic acid copolymer (D); and 40% by mass of methyl methacrylate resin PARAPET HR-L was used as the resin (C) containing a vinyl monomer. The pellets were able to be stably produced.

Production Example 4 [Production of Resin Composition (B2)]

A resin composition (B2-3) was obtained in the same way as in Production Example 2 except that: 70% by mass of R-200 was used as the styrene-unsaturated dicarboxylic acid copolymer (D); and 30% by mass of methyl methacrylate resin PARAPET HR-L was used as the resin (C) containing a vinyl monomer. The pellets were able to be stably produced.

Production Example 5 [Production of Resin Composition (B2)]

65% by mass of R-100 (manufactured by Denka Corp., weight average molecular weight: 170,000, d1:d2:d3=65:15:20) as a styrene-unsaturated dicarboxylic acid copolymer (D), 35% by mass of methyl methacrylate resin PARAPET HR-L (manufactured by Kuraray Co., Ltd., weight average molecular weight: 90,000) as a resin (C) containing a vinyl monomer, 500 ppm of a phosphorus additive PEP36 (manufactured by Adeka Corp.), and 0.2% of monoglyceride stearate (product name: H-100, manufactured by Riken Vitamin Co., Ltd.) were added. This composition was mixed for 20 minutes using a blender, then melt-kneaded at a cylinder temperature of 240° C. using a twin screw extruder having a screw diameter of 26 mm, and extruded into strands, which were then pelletized in a pelletizer to obtain a resin composition (B2-4). The pellets were able to be stably produced.

Production Example 6 [Production of Resin Composition (B2)]

A resin composition (B2-5) was obtained in the same way as in Production Example 5 except that: 75% by mass of R-100 was used as the styrene-unsaturated dicarboxylic acid copolymer (D); and 25% by mass of methyl methacrylate resin PARAPET HR-L was used as the resin (C) containing a vinyl monomer. The pellets were able to be stably produced.

Production Example 7 [Production of Resin Composition (B2)]

A resin composition (B2-6) was obtained in the same way as in Production Example 5 except that: 85% by mass of R-100 was used as the styrene-unsaturated dicarboxylic acid copolymer (D); and 15% by mass of methyl methacrylate resin PARAPET HR-L was used as the resin (C) containing a vinyl monomer. The pellets were able to be stably produced.

Production Example 8 [Production of Resin Composition (B2)]

50% by mass of KX-406 (manufactured by Denka Corp., weight average molecular weight: 155,000, d1:d2:d3=69:22:9) as a styrene-unsaturated dicarboxylic acid copolymer (D), 50% by mass of methyl methacrylate resin PARAPET HR-L (manufactured by Kuraray Co., Ltd., weight average molecular weight: 90,000) as a resin (C) containing a vinyl monomer, 500 ppm of a phosphorus additive PEP36 (manufactured by Adeka Corp.), and 0.2% of monoglyceride stearate (product name: H-100, manufactured by Riken Vitamin Co., Ltd.) were added. This composition was mixed for 20 minutes using a blender, then melt-kneaded at a cylinder temperature of 240° C. using a twin screw extruder having a screw diameter of 26 mm, and extruded into strands, which were then pelletized in a pelletizer to obtain a resin composition (B2-7). The pellets were able to be stably produced.

Production Example 9 [Production of Resin Composition (B2)]

75% by mass of KX-407 (manufactured by Denka Corp., weight average molecular weight: 165,000, d1:d2:d3=57:23:20) as a styrene-unsaturated dicarboxylic acid copolymer (D), 25% by mass of methyl methacrylate resin PARAPET HR-L (manufactured by Kuraray Co., Ltd., weight average molecular weight: 90,000) as a resin (C) containing a vinyl monomer, 500 ppm of a phosphorus additive PEP36 (manufactured by Adeka Corp.), and 0.2% of monoglyceride stearate (product name: H-100, manufactured by Riken Vitamin Co., Ltd.) were added. This composition was mixed for 20 minutes using a blender, then melt-kneaded at a cylinder temperature of 240° C. using a twin screw extruder having a screw diameter of 26 mm, and extruded into strands, which were then pelletized in a pelletizer to obtain a resin composition (B2-8). The pellets were able to be stably produced.

Production Example 10 [Production of Resin Composition (B2)]

50% by mass of KX-422 (manufactured by Denka Corp., weight average molecular weight: 119,000, d1:d2:d3=57:23:20) as a styrene-unsaturated dicarboxylic acid copolymer (D), 50% by mass of methyl methacrylate resin PARAPET HR-L (manufactured by Kuraray Co., Ltd., weight average molecular weight: 90,000) as a resin (C) containing a vinyl monomer, 500 ppm of a phosphorus additive PEP36 (manufactured by Adeka Corp.), and 0.2% of monoglyceride stearate (product name: H-100, manufactured by Riken Vitamin Co., Ltd.) were added. This composition was mixed for 20 minutes using a blender, then melt-kneaded at a cylinder temperature of 240° C. using a twin screw extruder having a screw diameter of 26 mm, and extruded into strands, which were then pelletized in a pelletizer to obtain a resin composition (B2-9). The pellets were able to be stably produced.

Production Example 11 [Production of Resin Composition (B3)]

30% by mass of METABLEN H-880 (manufactured by Mitsubishi Rayon Co., Ltd., weight average molecular weight: 14,000, f1/f2=33/66) as a (meth)acrylate copolymer (F) and 70% by mass of Lupilon E-2000 (manufactured by Mitsubishi Engineering-Plastics Corp., weight average molecular weight: 61,000) as a polycarbonate resin (E) were added. This composition was mixed for 30 minutes using a blender, then melt-kneaded at a cylinder temperature of 240° C. using a twin screw extruder (manufactured by Toshiba Machine Co., Ltd., TEM-26SS, L/D=40) having a screw diameter of 26 mm, and extruded into strands, which were then pelletized in a pelletizer to obtain a resin composition (B3-1). The pellets were able to be stably produced.

Production Example 12 [Production of Resin Composition (B3)]

A resin composition (B3-2) was obtained by palletization in the same way as in Production Example 11 except that the addition ratio between the (meth)acrylate copolymer (F) and the polycarbonate resin (E) was set to 50:50. The pellets were able to be stably produced.

Production Example 13 [Production of Resin Composition (B3)]

A resin composition (B3-3) was obtained by pelletization in the same way as in Production Example 11 except that the addition ratio between the (meth)acrylate copolymer (F) and the polycarbonate resin (E) was set to 20:80. The pellets were able to be stably produced.

Comparative Production Example 1 [Production of Comparative Example of Resin Composition (B3)]

Pelletization was performed in the same way as in Production Example 11 except that the addition ratio between the (meth)acrylate copolymer (F) and the polycarbonate resin (E) was set to 60:40. A resin composition (B3-4) was unable to be produced due to unstable pelletization.

Production Example 14 [Production of Resin Composition (B3)]

30% by mass of METABLEN H-880 (manufactured by Mitsubishi Rayon Co., Ltd., weight average molecular weight: 14,000) as a (meth)acrylate copolymer (F) and 70% by mass of Lupilon S-3000 (manufactured by Mitsubishi Engineering-Plastics Corp., weight average molecular weight: 47,000) as a polycarbonate resin (E) were added. This composition was mixed for 30 minutes using a blender, then melt-kneaded at a cylinder temperature of 240° C. using a twin screw extruder (manufactured by Toshiba Machine Co., Ltd., TEM-26SS, L/D≈40) having a screw diameter of 26 mm, and extruded into strands, which were then pelletized in a pelletizer to obtain a resin composition (B3-5). The pelletization were stably performed.

Production Example 15 [Production of Photocurable Resin Composition (X1) to Cover High Hardness Layer]

A composition consisting of 60 parts by mass of tris(2-acryloxyethyl) isocyanurate (manufactured by Sigma-Aldrich Co. LLC), 40 parts by mass of neopentyl glycol oligoacrylate (manufactured by Osaka Organic Chemical Industry Ltd., trade name: 215 D), 1 part by mass of 2,4,6-trimethylbenzoyl diphenylphosphine oxide (manufactured by Ciba Japan K.K., trade name: DAROCUR TPO), 0.3 parts by mass of 1-hydroxycyclohexyl phenyl ketone (manufactured by Sigma-Aldrich Co. LLC), and 1 part by mass of 2-(2H-benzotriazol-2-yl)-4,6-bis(1-methyl-1-phenylethyl)phenol (manufactured by Ciba Japan K.K., trade name: TINUVIN 234) was introduced into a mixing vessel equipped with a stirring blade, and stirred for 1 hour with the temperature kept at 40° C. to obtain a photocurable resin composition (X1).

Production Example 16 [Production of Photocurable Resin Composition (X2) to Cover Polycarbonate Base Material Layer]

A composition consisting of 40 parts by mass of 1,9-nonanediol diacrylate (manufactured by Osaka Organic Chemical Industry Ltd., trade name: Viscoat #260), 40 parts by mass of a hexafunctional urethane acrylate oligomer (manufactured by Shin-Nakamura Chemical Co., Ltd., trade name: U-6HA), 20 parts by mass of a succinic acid/trimethylolethane/acrylic acid condensate at a molar ratio of 1/2/4, 2.8 parts by mass of 2,4,6-trimethylbenzoyl diphenylphosphine oxide (manufactured by Ciba Japan K.K., trade name: DAROCUR TPO), 1 part by mass of benzophenone (manufactured by Sigma-Aldrich Co. LLC), and 1 part by mass of 2-(2H-benzotriazol-2-yl)-4,6-bis(1-methyl-1-phenylethyl)phenol (manufactured by Ciba Japan K.K., trade name: TINUVIN 234) was introduced into a mixing vessel equipped with a stirring blade, and stirred for 1 hour with the temperature kept at 40° C. to obtain a photocurable resin composition (X2).

Production Example 17 [Production of Patterned PET Film (Y1)]

50 parts by mass of MEK were mixed with 50 parts by mass of an acrylic ultraviolet curable resin (solid content: 100%, trade name: Light Acrylate DPE-6A, manufactured by Kyoeisha Chemical Co., Ltd.), 0.5 parts by mass of fine silica particles (octylsilane-treated fumed silica, average primary particle size: 12 nm, manufactured by Nippon Aerosil Co., Ltd.), 1 part by mass of acrylic silane-treated silica (average particle size: 1.9 μm, trade name: SE6050-SYB, manufactured by Admatechs Co., Ltd.), and 3 parts by mass of a photoinitiator (trade name: Irgacure 184, manufactured by Ciba Specialty Chemicals plc), and the mixture was stirred to prepare a coating liquid (i). Next, the coating liquid (i) was applied to a PET (polyethylene terephthalate) film such that the dry film thickness was 2.5 μm. After drying at 80° C. for 2 minutes, the coat was cured by ultraviolet irradiation under conditions involving a line speed of 1.5 m/min using a conveyor equipped with a high pressure mercury lamp having a light source distance of 12 cm and an output of 80 W/cm to prepare a patterned PET film (Y1).

Production Example 18 [Production of Patterned PET Film (Y2)]

A patterned PET film (Y2) was prepared in the same way as in Production Example 17 except that the dry film thickness of the coating liquid (i) was set to 3.5 μm.

Comparative Production Example 2 [Production of patterned PET film (Y3)] 50 parts by mass of MEK were mixed with 50 parts by mass of an acrylic ultraviolet curable resin (solid content: 100%, trade name: Light Acrylate DPE-6A, manufactured by Kyoeisha Chemical Co., Ltd.), 1.5 parts by mass of acrylic silane-treated silica (average particle size: 1.9 μm, trade name: SE6050-SYB, manufactured by Admatechs Co., Ltd.), and 3 parts by mass of a photoinitiator (trade name: Irgacure 184, manufactured by Ciba Specialty Chemicals plc), and the mixture was stirred to prepare a coating liquid (ii). Next, the coating liquid (ii) was applied to a PET (polyethylene terephthalate) film such that the dry film thickness was 1.5 μm. After drying at 80° C. for 2 minutes, the coat was cured by ultraviolet irradiation under conditions involving a line speed of 1.5 m/min using a conveyor equipped with a high pressure mercury lamp having a light source distance of 12 cm and an output of 80 W/cm to prepare a patterned PET film (Y3).

Production Example 19 [Synthesis of Chain Terminator for Polycarbonate Resin Production]

Esterification was performed through dehydration reaction using 4-hydroxybenzoic acid manufactured by Tokyo Chemical Industry Co., Ltd. and 1-hexadecanol manufactured by Tokyo Chemical Industry Co., Ltd. on the basis of Handbook of Organic Chemistry, third edition (Gihodo Shuppan Co., Ltd., 1981), p. 143-150 to obtain p-hydroxybenzoic acid hexadecyl ester (CEPB).

Production Example 20 [Synthesis of Resin (A) Comprising Polycarbonate Resin (a1)]

7.1 kg (31.14 mol) of bisphenol A (hereinafter, referred to as "BPA") manufactured by Nippon Steel & Sumikin Chemical Co., Ltd. and 30 g of hydrosulfite were added to 57.2 kg of an aqueous solution containing 9 w/w % of sodium hydroxide, and dissolved therein. To this solution, 40 kg of dichloromethane was added, and 4.33 kg of phosgene was blown into the mixture over 30 minutes while the solution temperature was kept within the range of 15° C. to 25° C. with stirring.

After the completion of the phosgene blowing, 6 kg of an aqueous solution containing 9 w/w % of sodium hydroxide, 11 kg of dichloromethane, and a solution containing 551 g (1.52 mol) of the p-hydroxybenzoic acid hexadecyl ester (CEPB) synthesized in Production Example 19 as a chain terminator, dissolved in 10 kg of methylene chloride were added thereto, and the mixture was emulsified by vigorous stirring. Then, 10 ml of triethylamine was further added as a polymerization catalyst to the solution, which was then polymerized for approximately 40 minutes.

The polymerization solution was separated into aqueous and organic phases. The organic phase was neutralized with phosphoric acid and repetitively washed with pure water until the pH of the washes became neutral. The organic solvent was distilled off from this purified polycarbonate resin solution to obtain a polycarbonate resin powder.

The obtained polycarbonate resin powder was melt-kneaded at a cylinder temperature of 260° C. using a twin screw extruder having a screw diameter of 35 mm, and extruded into strands, which were then pelletized in a pelletizer. The weight average molecular weight of the obtained polycarbonate resin (A1) was 47000.

TABLE 2

| Resin name | (Meth)acrylic acid ester constituent unit (a) | Aliphatic vinyl constituent unit (b) | Weight average molecular weight |
|---|---|---|---|
| Production Example 1 | B1-1 | 75 mol % | 25 mol % | 125000 |

TABLE 3

| | | Resin composition (B2) | | | | | | |
|---|---|---|---|---|---|---|---|---|
| | | Resin (C) containing vinyl monomer | | Styrene-unsaturated dicarboxylic acid copolymer (D) | | Styrene-unsaturated dicarboxylic acid copolymer (D) | | |
| | Resin name | Composition | Weight average molecular weight | Composition | Weight average molecular weight | Styrene monomer unit (d1) | Unsaturated dicarboxylic acid monomer unit (d2) | Vinyl monomer unit (d3) |
| Production Example 2 | B2-1 | 50% by mass | 90000 | 50% by mass | 185000 | 55% by mass | 20% by mass | 25% by mass |
| Production Example 3 | B2-2 | 40% by mass | 90000 | 60% by mass | 185000 | 55% by mass | 20% by mass | 25% by mass |
| Production Example 4 | B2-3 | 30% by mass | 90000 | 70% by mass | 185000 | 55% by mass | 20% by mass | 25% by mass |
| Production Example 5 | B2-4 | 35% by mass | 90000 | 65% by mass | 170000 | 65% by mass | 15% by mass | 20% by mass |
| Production Example 6 | B2-5 | 25% by mass | 90000 | 75% by mass | 170000 | 65% by mass | 15% by mass | 20% by mass |
| Production Example 7 | B2-6 | 15% by mass | 90000 | 85% by mass | 170000 | 65% by mass | 15% by mass | 20% by mass |
| Production Example 8 | B2-7 | 50% by mass | 90000 | 50% by mass | 155000 | 69% by mass | 22% by mass | 9% by mass |
| Production Example 9 | B2-8 | 25% by mass | 90000 | 75% by mass | 165000 | 57% by mass | 23% by mass | 20% by mass |
| Production Example 10 | B2-9 | 50% by mass | 90000 | 50% by mass | 119000 | 57% by mass | 23% by mass | 20% by mass |

TABLE 4

| | Resin name | Resin composition (B3) | | | | (Meth)acrylate copolymer (F) Aromatic (meth)acrylate unit |
|---|---|---|---|---|---|---|
| | | Polycarbonate resin (E) | | (Meth)acrylate copolymer (F) | | |
| | | Composition | Weight average molecular weight | Composition | Weight average molecular weight | (f1)/methacrylic acid ester monomer unit (f2) |
| Production Example 11 | B3-1 | 70% by mass | 61000 | 30% by mass | 14000 | 33/66 |
| Production Example 12 | B3-2 | 50% by mass | 61000 | 50% by mass | 14000 | 33/66 |
| Production Example 13 | B3-3 | 80% by mass | 61000 | 20% by mass | 14000 | 33/66 |
| Comparative Production Example 1 | B3-4 | 40% by mass | 61000 | 60% by mass | 14000 | 33/66 |
| Production Example 14 | B3-5 | 70% by mass | 47000 | 30% by mass | 14000 | 33/66 |

Example 1

A synthetic resin laminate was molded using a multilayer extrusion apparatus having a single-screw extruder having a screw diameter of 35 mm, a single-screw extruder having a screw diameter of 65 mm, a feed block connected to all the extruders, and a T die connected to the feed block. The vinyl copolymer resin (B1-1) obtained in Production Example 1 was continuously introduced into the single-screw extruder having a screw diameter of 35 mm and extruded under conditions involving a cylinder temperature of 240° C. and a discharge rate of 2.6 kg/h. Also, a polycarbonate resin (A2) (manufactured by Mitsubishi Engineering-Plastics Corp., trade name: Lupilon S-1000, weight average molecular weight: 59,000) was continuously introduced into the single-screw extruder having a screw diameter of 65 mm and extruded at a cylinder temperature of 280° C. and a discharge rate of 50.0 kg/h. The feed block connected to all the extruders had distribution pins of two kinds and two layers. The vinyl copolymer resin (B1-1) and the polycarbonate resin (A2) were introduced thereinto and laminated at a temperature of 270° C. The laminate was extruded into a sheet by the downstream connected T die having a temperature of 270° C. The sheet was cooled while a mirror surface was transferred thereto using three mirror finish rolls (temperatures from upstream: 120° C., 130° C., and 190° C.). The take-off speed was adjusted to obtain a laminate of a high hardness layer containing the vinyl copolymer resin (B1-1) and a base material layer containing the polycarbonate resin (A2), having a retardation of 4500 nm. The thickness of the obtained laminate was 1,200 μm, and the thickness of the high hardness layer containing the vinyl copolymer resin (B1-1) was 60 μm near the center.

The photocurable resin composition (X1) obtained in Production Example 15 was applied onto the high hardness layer containing the vinyl copolymer resin (B1-1) in the laminate, using a bar coater such that the coat thickness after curing was 3 to 8 μm. The resin composition was covered with the patterned PET film (Y1) prepared in Production Example 17, with its patterned surface in contact with the application liquid, and pressure-bonded together. Next, the photocurable resin composition (X2) obtained in Production Example 16 was applied onto the base material layer containing the polycarbonate resin (A2), using a bar coater such that the coat thickness after curing was 3 to 8 μm. The resin composition was covered with a PET film and pressure-bonded together. Then, the coats were cured by ultraviolet irradiation under conditions involving a line speed of 1.5 m/min using a conveyor equipped with a high pressure mercury lamp having a light source distance of 12 cm and an output of 80 W/cm. The patterned PET film and the PET film were detached therefrom to obtain a front panel comprising hard coat layers consisting of the photocurable resin compositions (X1) and (X2) on the high hardness layer containing the vinyl copolymer resin (B1-1) and the base material layer containing the polycarbonate resin (A2), respectively.

Example 2

A synthetic resin laminate was molded using a multilayer extrusion apparatus having: a multilayer extruder having a single-screw extruder having a screw diameter of 32 mm, a single-screw extruder having a screw diameter of 65 mm, a feed block connected to all the extruders, and a T die connected to the feed block; and a multi-manifold die connected to each extruder. The resin composition (B2-1) obtained in Production Example 2 was continuously introduced into the single-screw extruder having a screw diameter of 32 mm and extruded under conditions involving a cylinder temperature of 240° C. and a discharge rate of 2.1 kg/h. Also, a polycarbonate resin (A2) (manufactured by Mitsubishi Engineering-Plastics Corp., trade name: Lupilon S-1000, weight average molecular weight: 59,000) was continuously introduced into the single-screw extruder having a screw diameter of 65 mm and extruded at a cylinder temperature of 270° C. and a discharge rate of 30.0 kg/h. The feed block connected to all the extruders had distribution pins of two kinds and two layers. The resin composition (B2-1) and the polycarbonate resin (A2) were introduced thereinto and laminated at a temperature of 270° C. The laminate was extruded into a sheet by the downstream connected T die having a temperature of 270° C. The sheet was cooled while a mirror surface was transferred thereto using three mirror finish rolls (temperatures from upstream: 130° C., 140° C., and 180° C.). The take-off speed was adjusted to obtain a laminate of a high hardness layer containing the resin composition (B2-1) and a base material layer containing the polycarbonate resin (A2), having a retardation of 3500 nm. The total thickness of the obtained laminate was 1,000 Jim, and the thickness of the high hardness layer containing the resin composition (B2-1) was 60 μm near the center.

Subsequently, hard coat layers consisting of the photo-curable resin compositions (X1) and (X2) were formed on the high hardness layer containing the resin composition (B2-1) and the base material layer containing the polycarbonate resin (A2), respectively, in the laminate in the same way as in Example 1 to obtain a front panel.

Example 3

A laminate of a high hardness layer containing the resin composition (B2-2) and a base material layer containing the polycarbonate resin (A2) was obtained in the same way as in Example 2 except that the high hardness layer was produced using the resin composition (B2-2) obtained in Production Example 3. The total thickness of the obtained laminate was 1,000 μm, and the thickness of the high hardness layer containing the resin composition (B2-2) was 60 μm near the center. The retardation was 6000 nm.

Subsequently, hard coat layers consisting of the photo-curable resin compositions (X1) and (X2) were formed on the high hardness layer containing the resin composition (B2-2) and the base material layer containing the polycarbonate resin (A2), respectively, in the laminate in the same way as in Example 1 to obtain a front panel.

Example 4

A laminate of a high hardness layer containing the resin composition (B2-3) and a base material layer containing the polycarbonate resin (A2) was obtained in the same way as in Example 2 except that the high hardness layer was produced using the resin composition (B2-3) obtained in Production Example 4. The total thickness of the obtained laminate was 1,000 μm, and the thickness of the high hardness layer containing the resin composition (B2-3) was 60 μm near the center. The retardation was 4000 nm.

Subsequently, hard coat layers consisting of the photo-curable resin compositions (X1) and (X2) were formed on the high hardness layer containing the resin composition (B2-3) and the base material layer containing the polycacbonate resin (A2), respectively, in the laminate in the same way as in Example 1 to obtain a front panel.

Example 5

A laminate of a high hardness layer containing the resin composition (B2-4) and a base material layer containing the polycarbonate resin (A2) was obtained in the same way as in Example 2 except that the high hardness layer was produced using the resin composition (B2-4) obtained in Production Example 5. The total thickness of the obtained laminate was 1,000 μm, and the thickness of the high hardness layer containing the resin composition (B2-4) was 60 μm near the center. The retardation was 4500 nm.

Subsequently, hard coat layers consisting of the photo-curable resin compositions (X1) and (X2) were formed on the high hardness layer containing the resin composition (B2-4) and the base material layer containing the polycarbonate resin (A2), respectively, in the laminate in the same way as in Example 1 to obtain a front panel.

Example 6

A laminate of a high hardness layer containing the resin composition (B2-5) and a base material layer containing the polycarbonate resin (A2) was obtained in the same way as in Example 2 except that the high hardness layer was produced using the resin composition (B2-5) obtained in Production Example 6. The total thickness of the obtained laminate was 1,000 μm, and the thickness of the high hardness layer containing the resin composition (B2-5) was 60 μm near the center. The retardation was 3700 nm.

Subsequently, hard coat layers consisting of the photo-curable resin compositions (X1) and (X2) were formed on the high hardness layer containing the resin composition (B2-5) and the base material layer containing the polycarbonate resin (A2), respectively, in the laminate in the same way as in Example 1 to obtain a front panel.

Example 7

A laminate of a high hardness layer containing the resin composition (B2-6) and a base material layer containing the polycarbonate resin (A2) was obtained in the same way as in Example 2 except that the high hardness layer was produced using the resin composition (B2-6) obtained in Production Example 7. The total thickness of the obtained laminate was 1,000 μm, and the thickness of the high hardness layer containing the resin composition (B2-6) was 60 μm near the center. The retardation was 6500 nm.

Subsequently, hard coat layers consisting of the photo-curable resin compositions (X1) and (X2) were formed on the high hardness layer containing the resin composition (B2-6) and the base material layer containing the polycarbonate resin (A2), respectively, in the laminate in the same way as in Example 1 to obtain a front panel, except that the patterned PET film (Y1) was changed to the patterned PET film (Y2).

Example 8

A synthetic resin laminate was molded using a multilayer extrusion apparatus having: a multilayer extruder having a single-screw extruder having a screw diameter of 32 mm, a single-screw extruder having a screw diameter of 65 mm, a feed block connected to all the extruders, and a T die connected to the feed block; and a multi-manifold die connected to each extruder. The resin composition (B2-7) obtained in Production Example 8 was continuously introduced into the single-screw extruder having a screw diameter of 32 mm and extruded under conditions involving a cylinder temperature of 240° C. and a discharge rate of 2.1 kg/h. Also, a polycarbonate resin (A2) (manufactured by Mitsubishi Engineering-Plastics Corp., trade name: Lupilon S-1000, weight average molecular weight: 59,000) was continuously introduced into the single-screw extruder having a screw diameter of 65 mm and extruded at a cylinder temperature of 270° C. and a discharge rate of 30.0 kg/h. The feed block connected to all the extruders had distribution pins of two kinds and two layers. The resin composition (B2-7) and the polycarbonate resin (A2) were introduced thereinto and laminated at a temperature of 270° C. The laminate was extruded into a sheet by the downstream connected T die having a temperature of 270° C. The sheet was cooled while a mirror surface was transferred thereto using three mirror finish rolls (temperatures from upstream: 130° C., 140° C., and 180° C.). The take-off speed was adjusted to obtain a laminate of a high hardness layer containing the resin composition (B2-7) and a base material layer containing the polycarbonate resin (A2), having a retardation of 6000 nm.

The total thickness of the obtained laminate was 1,000 μm, and the thickness of the high hardness layer containing the resin composition (B2-7) was 60 μm near the center.

Subsequently, hard coat layers consisting of the photo-curable resin compositions (X1) and (X2) were formed on the high hardness layer containing the resin composition (B2-7) and the base material layer containing the polycarbonate resin (A2), respectively, in the laminate in the same way as in Example 7 to obtain a front panel.

Example 9

A laminate of a high hardness layer containing the resin composition (B2-8) and a base material layer containing the polycarbonate resin (A2) was obtained in the same way as in Example 8 except that the resin composition (B2-8) was used instead of the resin composition (B2-7). The total thickness of the obtained laminate was 1,000 μm, and the thickness of the high hardness layer containing the resin composition (B2-8) was 60 μm near the center. The retardation was 4700 nm.

Subsequently, hard coat layers consisting of the photo-curable resin compositions (X1) and (X2) were formed on the high hardness layer containing the resin composition (B2-8) and the base material layer containing the polycarbonate resin (A2), respectively, in the laminate in the same way as in Example 7 to obtain a front panel.

Example 10

A laminate of a high hardness layer containing the resin composition (B2-9) and a base material layer containing the polycarbonate resin (A2) was obtained in the same way as in Example 8 except that the resin composition (B2-9) was used instead of the resin composition (B2-7). The total thickness of the obtained laminate was 1,000 μm, and the thickness of the high hardness layer containing the resin composition (B2-9) was 60 μm near the center. The retardation was 5200 nm.

Subsequently, hard coat layers consisting of the photo-curable resin compositions (X1) and (X2) were formed on the high hardness layer containing the resin composition (B2-9) and the base material layer containing the polycarbonate resin (A2), respectively, in the laminate in the same way as in Example 7 to obtain a front panel.

Example 11

A synthetic resin laminate was molded using a multilayer extrusion apparatus having a single-screw extruder having a screw diameter of 32 mm, a single-screw extruder having a screw diameter of 65 mm, a feed block connected to all the extruders, and a T die connected to the feed block. The resin composition (B3-1) obtained in Production Example 11 was continuously introduced into the single-screw extruder having a screw diameter of 32 mm and extruded under conditions involving a cylinder temperature of 240° C. and a discharge rate of 2.1 kg/h. Also, a polycarbonate resin (A3) (manufactured by Mitsubishi Engineering-Plastics Corp., trade name: Lupilon S-3000, weight average molecular weight: 47,000) was continuously introduced into the single-screw extruder having a screw diameter of 65 mm and extruded at a cylinder temperature of 270° C. and a discharge rate of 30.0 kg/h. The feed block connected to all the extruders had distribution pins of two kinds and two layers. The resin composition (B3-1) and the polycarbonate resin (A3) were introduced thereinto and laminated at a temperature of 270° C. The laminate was extruded into a sheet by the downstream connected T die having a temperature of 270° C. The sheet was cooled while a mirror surface was transferred thereto using three mirror finish rolls (temperatures from upstream: 130° C., 140° C., and 180° C.). The take-off speed was adjusted to obtain a laminate of a high hardness layer containing the resin composition (B3-1) and a base material layer containing the polycarbonate resin (A3), having a retardation of 4400 nm. The thickness of the obtained laminate was 1,000 μm, and the thickness of the high hardness layer containing the resin composition (B3-1) was 60 μm near the center.

Subsequently, hard coat layers consisting of the photo-curable resin compositions (X1) and (X2) were formed on the high hardness layer containing the resin composition (B3-1) and the base material layer containing the polycarbonate resin (A3), respectively, in the laminate in the same way as in Example 1 to obtain a front panel.

Example 12

A laminate of a high hardness layer containing the resin composition (B3-2) and a base material layer containing the polycarbonate resin (A3) was obtained in the same way as in Example 1 except that the resin composition (B3-2) obtained in Production Example 12 was used instead of the resin composition (B3-1) used in Example 11. The thickness of the obtained laminate was 1,000 μm, and the thickness of the high hardness layer containing the resin composition (B3-2) was 60 μm near the center. The retardation was 6200 nm.

Subsequently, hard coat layers consisting of the photo-curable resin compositions (X1) and (X2) were formed on the high hardness layer containing the resin composition (B3-2) and the base material layer containing the polycarbonate resin (A3), respectively, in the laminate in the same way as in Example 1 to obtain a front panel.

Example 13

A laminate of a high hardness layer containing the resin composition (B3-1) and a base material layer containing the polycarbonate resin (A3) was obtained in the same way as in Example 11 except that: the resin composition (B3-3) obtained in Production Example 13 was used instead of the resin composition (B3-1) used in Example 11; its discharge rate was set to 7.0 kg/h; and the discharge rate of the polycarbonate resin (A3) was set to 25 kg/h. The thickness of the obtained laminate was 1,000 μm, and the thickness of the high hardness layer containing the resin composition (B3-3) was 200 μm near the center. The retardation was 4700 nm.

Subsequently, hard coat layers consisting of the photo-curable resin compositions (X1) and (X2) were formed on the high hardness layer containing the resin composition (B3-3) and the base material layer containing the polycarbonate resin (A3), respectively, in the laminate in the same way as in Example 7 to obtain a front panel.

Example 14

A laminate of a high hardness layer containing the resin composition (B3-5) and a base material layer containing the polycarbonate resin (A3) was obtained in the same way as in Example 11 except that the resin composition (B3-5) obtained in Production Example 14 was used instead of the resin composition (B3-1) used in Example 11. The thickness of the obtained laminate was 1,000 µm, and the thickness of the high hardness layer containing the resin composition (B3-5) was 60 µm near the center. The retardation was 4500 nm.

Subsequently, hard coat layers consisting of the photo-curable resin compositions (X1) and (X2) were formed on the high hardness layer containing the resin composition (B3-5) and the base material layer containing the polycarbonate resin (A3), respectively, in the laminate in the same way as in Example 7 to obtain a front panel.

Example 15

Laminate preparation and hard coat formation were performed in the same way as in Example 1 to obtain a front panel, except that the polycarbonate resin (A2) was changed to the polycarbonate resin (A1) produced in Production Example 20.

Example 16

Laminate preparation and hard coat formation were performed in the same way as in Example 2 to obtain a front panel, except that the polycarbonate resin (A2) was changed to the polycarbonate resin (A1) produced in Production Example 20.

Example 17

Laminate preparation and hard coat formation were performed in the same way as in Example 3 to obtain a front panel, except that the polycarbonate resin (A2) was changed to the polycarbonate resin (A1) produced in Production Example 20.

Example 18

Laminate preparation and hard coat formation were performed in the same way as in Example 4 to obtain a front panel, except that the polycarbonate resin (A2) was changed to the polycarbonate resin (A1) produced in Production Example 20.

Example 19

Laminate preparation and hard coat formation were performed in the same way as in Example 5 to obtain a front panel, except that the polycarbonate resin (A2) was changed to the polycarbonate resin (A1) produced in Production Example 20.

Example 20

Laminate preparation and hard coat formation were performed in the same way as in Example 6 to obtain a front panel, except that the polycarbonate resin (A2) was changed to the polycarbonate resin (A1) produced in Production Example 20.

Example 21

Laminate preparation and hard coat formation were performed in the same way as in Example 7 to obtain a front panel, except that the polycarbonate resin (A2) was changed to the polycarbonate resin (A1) produced in Production Example 20.

Example 22

Laminate preparation and hard coat formation were performed in the same way as in Example 8 to obtain a front panel, except that the polycarbonate resin (A2) was changed to the polycarbonate resin (A1) produced in Production Example 20.

Example 23

Laminate preparation and hard coat formation were performed in the same way as in Example 9 to obtain a front panel, except that the polycarbonate resin (A2) was changed to the polycarbonate resin (A1) produced in Production Example 20.

Example 24

Laminate preparation and hard coat formation were performed in the same way as in Example 10 to obtain a front panel, except that the polycarbonate resin (A2) was changed to the polycarbonate resin (A1) produced in Production Example 20.

Example 25

Laminate preparation and hard coat formation were performed in the same way as in Example 11 to obtain a front panel, except that the polycarbonate resin (A3) was changed to the polycarbonate resin (A1) produced in Production Example 20.

Example 26

Laminate preparation and hard coat formation were performed in the same way as in Example 12 to obtain a front panel, except that the polycarbonate resin (A3) was changed to the polycarbonate resin (A1) produced in Production Example 20.

Example 27

Laminate preparation and hard coat formation were performed in the same way as in Example 13 to obtain a front panel, except that the polycarbonate resin (A3) was changed to the polycarbonate resin (A1) produced in Production Example 20.

Example 28

Laminate preparation and hard coat formation were performed in the same way as in Example 14 to obtain a front panel, except that the polycarbonate resin (A3) was changed to the polycarbonate resin (A1) produced in Production Example 20.

Comparative Example 1

Laminate preparation and hard coat formation were performed in the same way as in Example 2 to obtain a front panel, except that methyl methacrylate resin PARAPET HR-L (manufactured by Kuraray Co., Ltd., weight average molecular weight: 90,000) was used instead of the resin composition (B2-1).

Comparative Example 2

Laminate preparation and hard coat formation were performed in the same way as in Example 2 to obtain a front panel, except that: the polycarbonate resin (A2) was changed to the polycarbonate resin (A1) produced in Production Example 20; and methyl methacrylate resin PARAPET HR-L (manufactured by Kuraray Co., Ltd., weight average molecular weight: 90,000) was used instead of the resin composition (B2-1).

Comparative Example 3

Hard coat layers consisting of the photocurable resin compositions (X1) and (X2) were formed on the high hardness layer containing the methyl methacrylate resin and the base material layer containing the polycarbonate resin (A2), respectively, in the laminate in the same way as in Comparative Example 1 to obtain a front panel, except that the patterned PET film (Y1) was changed to the patterned PET film (Y3).

Comparative Example 4

Hard coat layers consisting of the photocurable resin compositions (X1) and (X2) were formed on the high hardness layer containing the methyl methacrylate resin and the base material layer containing the polycarbonate resin (A1), respectively, in the laminate in the same way as in Comparative Example 2 to obtain a front panel, except that the patterned PET film (Y1) was changed to the patterned PET film (Y3).

Comparative Example 5

Hard coat layers consisting of the photocurable resin compositions (X1) and (X2) were formed on the high hardness layer containing the resin composition (B2-1) and the base material layer containing the polycarbonate resin (A2), respectively, in the laminate in the same way as in Example 2 to obtain a front panel, except that the patterned PET film (Y1) was changed to the patterned PET film (Y3).

Comparative Example 6

Laminate preparation and hard coat formation were performed in the same way as in Example 2 to obtain a front panel, except that the take-off speed was adjusted to attain a retardation of 2000 nm.

The front panel obtained in each of Examples and Comparative Examples was evaluated for its shape stability, pencil hardness, glare, blackout, standard deviation of the second derivative of the irregular shape of the hard coat layer having irregularities, and roughness. The evaluation results, layer thicknesses, and retardation values are summarized in the table below.

As seen from the table below, the configuration according to the present invention can be suitably used as a front panel for on-board liquid crystal displays because use thereof is excellent in shape stability and pencil hardness, is free from glare, and can also make measures against blackout. On the other hand, Comparative Examples 1 to 4 using methyl methacrylate resin as the high hardness resin composition (B) were inferior in shape stability. Comparative Examples 3 to 5 in which the standard deviation of the second derivative of the irregular shape of the hard coat layer having irregularities was less than 0.1 generated glare. Comparative Example 6 in which the retardation of the front panel was less than 3,000 nm produced poor results about blackout.

TABLE 5

| | High hardness layer/base material layer | High hardness layer thickness (μm) | Total thickness of high hardness layer and base material layer (μm) | Retardation (nm) | Standard deviation of second derivative of irregular shape of hard coat layer | Ra value of hard coat layer | Shape stability (μm) |
|---|---|---|---|---|---|---|---|
| Example 1 | B1-1/S1000 | 60 | 1200 | 4500 | 0.22 | 0.09 | 60 |
| Example 2 | B2-1/S1000 | 60 | 1000 | 3500 | 0.16 | 0.08 | 310 |
| Example 3 | B2-2/S1000 | 60 | 1000 | 6000 | 0.14 | 0.09 | 30 |
| Example 4 | B2-3/S1000 | 60 | 1000 | 4000 | 0.14 | 0.08 | 190 |
| Example 5 | B2-4/S1000 | 60 | 1000 | 4500 | 0.26 | 0.07 | 30 |
| Example 6 | B2-5/S1000 | 60 | 1000 | 3700 | 0.12 | 0.09 | 50 |
| Example 7 | B2-6/S1000 | 60 | 1000 | 6500 | 0.18 | 0.05 | 140 |
| Example 8 | B2-7/S1000 | 60 | 1000 | 6000 | 0.19 | 0.06 | 30 |
| Example 9 | B2-8/S1000 | 60 | 1000 | 4700 | 0.14 | 0.07 | 350 |
| Example 10 | B2-9/S1000 | 60 | 1000 | 5200 | 0.15 | 0.05 | 130 |
| Example 11 | B3-1/S3000 | 60 | 1000 | 4400 | 0.19 | 0.07 | 20 |
| Example 12 | B3-2/S3000 | 60 | 1000 | 6200 | 0.20 | 0.08 | 60 |
| Example 13 | B3-3/S3000 | 200 | 1000 | 4700 | 0.21 | 0.07 | 50 |
| Example 14 | B3-5/S3000 | 60 | 1000 | 4500 | 0.16 | 0.06 | 20 |
| Example 15 | B1-1/A1 | 60 | 1200 | 1700 | 0.18 | 0.09 | 30 |
| Example 16 | B2-1/A1 | 60 | 1000 | 3600 | 0.12 | 0.08 | 260 |
| Example 17 | B2-2/A1 | 60 | 1000 | 5800 | 0.14 | 0.07 | 20 |
| Example 18 | B2-3/A1 | 60 | 1000 | 4000 | 0.16 | 0.09 | 170 |
| Example 19 | B2-4/A1 | 60 | 1000 | 4300 | 0.20 | 0.07 | 20 |
| Example 20 | B2-5/A1 | 60 | 1000 | 3900 | 0.18 | 0.09 | 30 |
| Example 21 | B2-6/A1 | 60 | 1000 | 6700 | 0.14 | 0.06 | 110 |
| Example 22 | B2-7/A1 | 60 | 1000 | 6000 | 0.19 | 0.05 | 20 |
| Example 23 | B2-8/A1 | 60 | 1000 | 4500 | 0.21 | 0.07 | 300 |
| Example 24 | B2-9/A1 | 60 | 1000 | 5200 | 0.19 | 0.06 | 120 |
| Example 25 | B3-1/A1 | 60 | 1000 | 4500 | 0.16 | 0.09 | 10 |
| Example 26 | B3-2/A1 | 60 | 1000 | 6400 | 0.14 | 0.08 | 140 |
| Example 27 | B3-3/A1 | 200 | 1000 | 4900 | 0.20 | 0.07 | 40 |
| Example 28 | B3-5/A1 | 60 | 1000 | 4300 | 0.17 | 0.07 | 10 |
| Comparative Example 1 | PMMA/S1000 | 60 | 1000 | 4500 | 0.17 | 0.09 | 1200 |
| Comparative Example 2 | PMMA/A1 | 60 | 1000 | 5000 | 0.20 | 0.07 | 1130 |

TABLE 5-continued

| | | | | | | | |
|---|---|---|---|---|---|---|---|
| Comparative Example 3 | PMMA/S1000 | 60 | 1000 | 6500 | 0.06 | 0.14 | 1160 |
| Comparative Example 4 | PMMA/A1 | 60 | 1000 | 5500 | 0.08 | 0.11 | 1040 |
| Comparative Example 5 | B2-1/S1000 | 60 | 1000 | 3500 | 0.06 | 0.13 | 290 |
| Comparative Example 6 | B2-1/S1000 | 60 | 1000 | 2000 | 0.16 | 0.08 | 260 |

| | Presence or absence of glare | Blackout | Pencil hardness on high hardness layer side | PET for pattern | HC coating material on high hardness layer side | HC coating material on base material layer side |
|---|---|---|---|---|---|---|
| Example 1 | absent | good | 4H | Y1 | X1 | X2 |
| Example 2 | absent | good | 2H | Y1 | X1 | X2 |
| Example 3 | absent | good | 2H | Y1 | X1 | X2 |
| Example 4 | absent | good | 2H | Y1 | X1 | X2 |
| Example 5 | absent | good | 3H | Y1 | X1 | X2 |
| Example 6 | absent | good | 3H | Y1 | X1 | X2 |
| Example 7 | absent | good | 3H | Y2 | X1 | X2 |
| Example 8 | absent | good | 4H | Y2 | X1 | X2 |
| Example 9 | absent | good | 4H | Y2 | X1 | X2 |
| Example 10 | absent | good | 4H | Y2 | X1 | X2 |
| Example 11 | absent | good | 2H | Y1 | X1 | X2 |
| Example 12 | absent | good | 2H | Y1 | X1 | X2 |
| Example 13 | absent | good | 2H | Y2 | X1 | X2 |
| Example 14 | absent | good | 2H | Y2 | X1 | X2 |
| Example 15 | absent | good | 4H | Y1 | X1 | X2 |
| Example 16 | absent | good | 2H | Y1 | X1 | X2 |
| Example 17 | absent | good | 2H | Y1 | X1 | X2 |
| Example 18 | absent | good | 2H | Y1 | X1 | X2 |
| Example 19 | absent | good | 3H | Y1 | X1 | X2 |
| Example 20 | absent | good | 3H | Y1 | X1 | X2 |
| Example 21 | absent | good | 3H | Y2 | X1 | X2 |
| Example 22 | absent | good | 4H | Y2 | X1 | X2 |
| Example 23 | absent | good | 4H | Y2 | X1 | X2 |
| Example 24 | absent | good | 4H | Y2 | X1 | X2 |
| Example 25 | absent | good | 2H | Y1 | X1 | X2 |
| Example 26 | absent | good | 2H | Y1 | X1 | X2 |
| Example 27 | absent | good | 2H | Y2 | X1 | X2 |
| Example 28 | absent | good | 2H | Y2 | X1 | X2 |
| Comparative Example 1 | absent | good | 4H | Y1 | X1 | X2 |
| Comparative Example 2 | absent | good | 4H | Y1 | X1 | X2 |
| Comparative Example 3 | present | good | 4H | Y3 | X1 | X2 |
| Comparative Example 4 | present | good | 4H | Y3 | X1 | X2 |
| Comparative Example 5 | present | good | 2H | Y3 | X1 | X2 |
| Comparative Example 6 | absent | unacceptable | 2H | Y1 | X1 | X2 |

INDUSTRIAL APPLICABILITY

According to a preferred embodiment of the present invention, the present invention can provide a front panel for on-board liquid crystal displays that prevents glare, has high abrasion resistance, also has high pencil hardness, and is also excellent in the inhibition of warpage, while exhibiting excellent impact resistance, heat resistance and anti-glare performance.

The invention claimed is:

1. A front panel for on-board liquid crystal displays, having a layer containing a high hardness resin composition (B) on at least one side of a layer containing a resin (A) comprising a polycarbonate resin (a1), and further having a hard coat layer having irregularities on the layer containing a high hardness resin composition (B), wherein the front panel satisfies the following conditions (i) to (iv):
   (i) the thickness of the layer containing a high hardness resin composition (B) is 10 to 250 μm, and the total thickness of the layer containing a resin (A) comprising a polycarbonate resin (a1) and the layer containing a high hardness resin composition (B) is 100 to 3,000 μm;
   (ii) the high hardness resin composition (B) consists of any one of the following resin compositions (B1) to (B3):
   Resin composition (B1)
      A copolymer resin comprising a (meth)acrylic acid ester constituent unit (a) represented by the following general formula (1), and an aliphatic vinyl constituent unit (b) represented by the following general formula (2), wherein the total ratio of the methacrylic acid ester constituent unit (a) and the aliphatic vinyl constituent unit (b) is 90 to 100 mol % of all constituent units of the copolymer resin, and the ratio of the (meth)acrylic acid ester constituent unit (a) is 65 to 80 mol % of all constituent units of the copolymer resin:

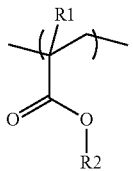

(1)

wherein R1 is a hydrogen atom or a methyl group, and R2 is an alkyl group having 1 to 18 carbon atoms

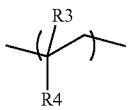

(2)

wherein R3 is a hydrogen atom or a methyl group, and R4 is a cyclohexyl group optionally having a hydrocarbon group having 1 to 4 carbon atoms;

Resin composition (B2)

A resin composition comprising 55 to 10% by mass of a resin (C) containing a vinyl monomer, and 45 to 90% by mass of a styrene-unsaturated dicarboxylic acid copolymer (D), wherein the styrene-unsaturated dicarboxylic acid copolymer (D) comprises 50 to 80% by mass of a styrene monomer unit (d1), 10 to 30% by mass of an unsaturated dicarboxylic anhydride monomer unit (d2), and 5 to 30% by mass of a vinyl monomer unit (d3); and Resin composition (B3)

A resin composition comprising 95 to 45% by mass of a polycarbonate resin (E) and 5 to 55% by mass of a (meth)acrylate copolymer (F), wherein the (meth)acrylate copolymer (F) comprises an aromatic (meth)acrylate unit (f1) and a methacrylic acid ester monomer unit (f2) at a mass ratio (f1/f2) of 10 to 50/40 to 90, the weight average molecular weight of the polycarbonate resin (E) is 37,000 to 71,000, and the weight average molecular weight of the (meth)acrylate copolymer (F) is 5,000 to 30,000;

(iii) the retardation of the front panel is 3,000 nm or more; and (iv) the standard deviation of the second derivative of the irregular shape of the hard coat layer having irregularities is 0.1 or more.

2. The front panel for on-board liquid crystal displays according to claim 1, wherein the front panel has another hard coat layer on a side opposite to the hard coat layer having irregularities.

3. The front panel for on-board liquid crystal displays according to claim 1, wherein the front panel has a warpage change of 1,000 μm or less after being kept for 120 hours in an environment involving a temperature of 85° C. and a relative humidity of 85%.

4. The front panel for on-board liquid crystal displays according to claim 1, wherein the layer containing a high hardness resin composition (B) is prepared by coextrusion with the layer containing a resin (A) comprising a polycarbonate resin (a1).

5. The front panel for on-board liquid crystal displays according to claim 1, wherein the polycarbonate resin (a1) comprises a component derived from a monohydric phenol represented by the following general formula (4):

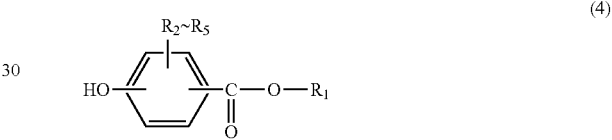

(4)

wherein $R_1$ represents an alkyl group having 8 to 36 carbon atoms or an alkenyl group having 8 to 36 carbon atoms, $R_2$ to $R_5$ each independently represent a hydrogen atom, halogen, an alkyl group having 1 to 20 carbon atoms which optionally has a substituent, or an aryl group having 6 to 12 carbon atoms which optionally has a substituent, and the substituent is halogen, an alkyl group having 1 to 20 carbon atoms, or an aryl group having 6 to 12 carbon atoms.

* * * * *